Jan. 28, 1969  TAKATSUGU SHIMAMOTO ET AL  3,423,910

HARVESTER COMBINE

Filed June 30, 1965

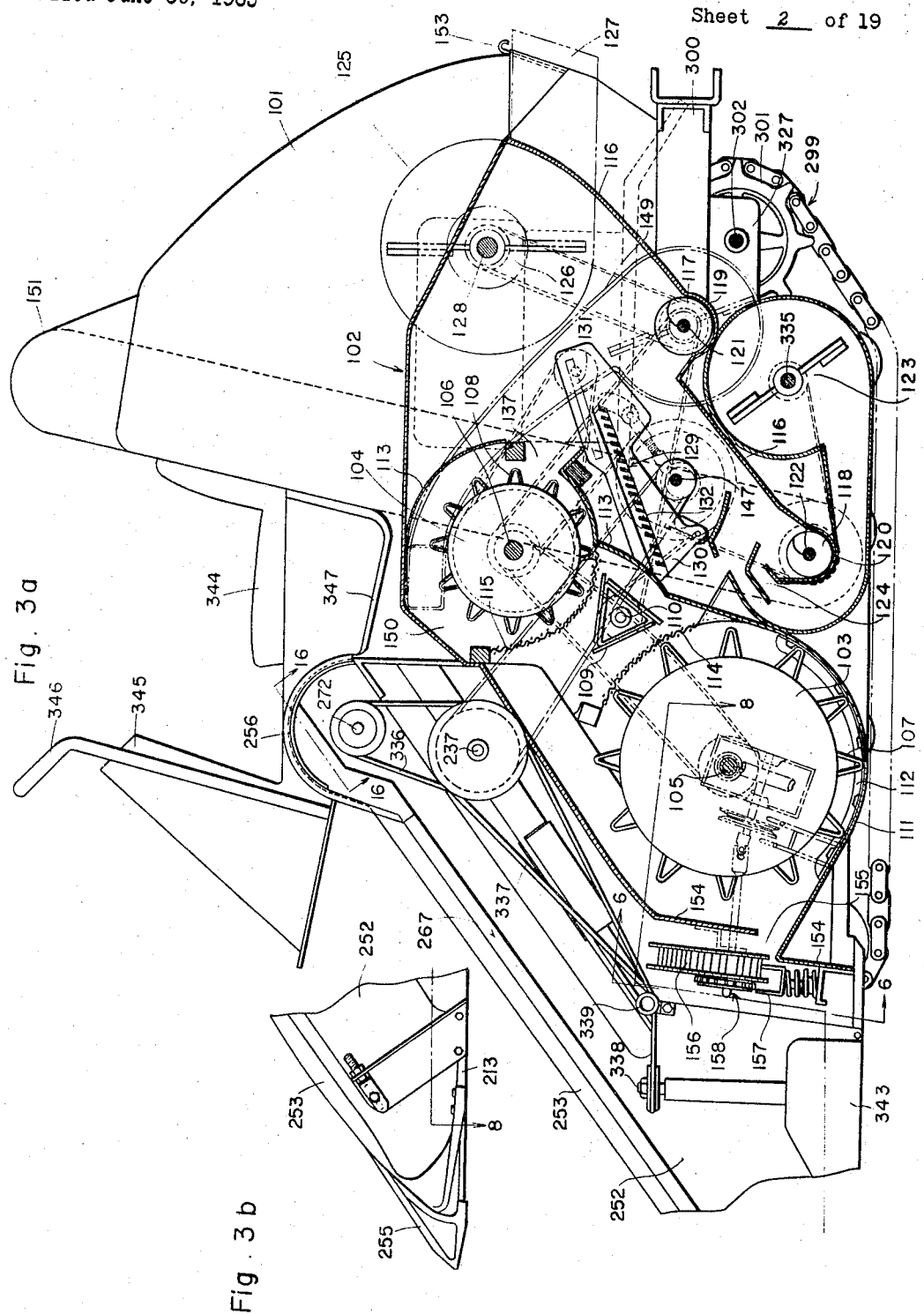

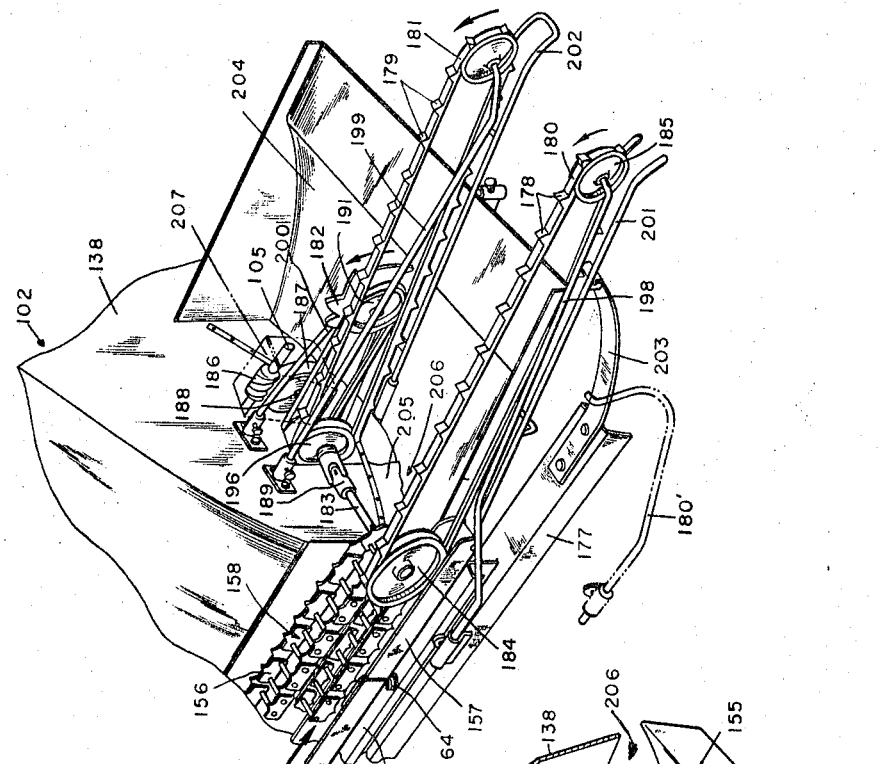

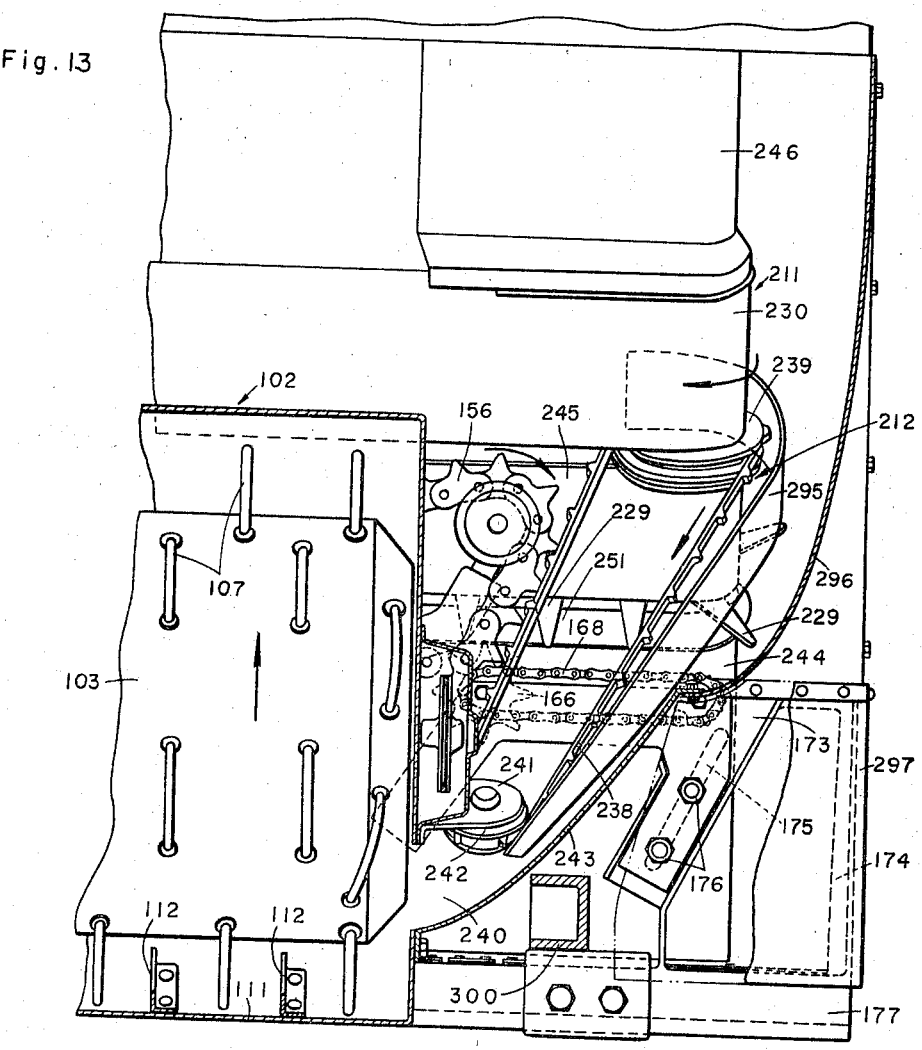
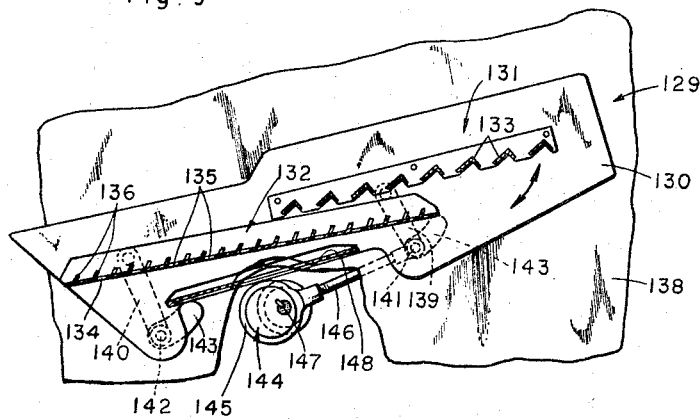

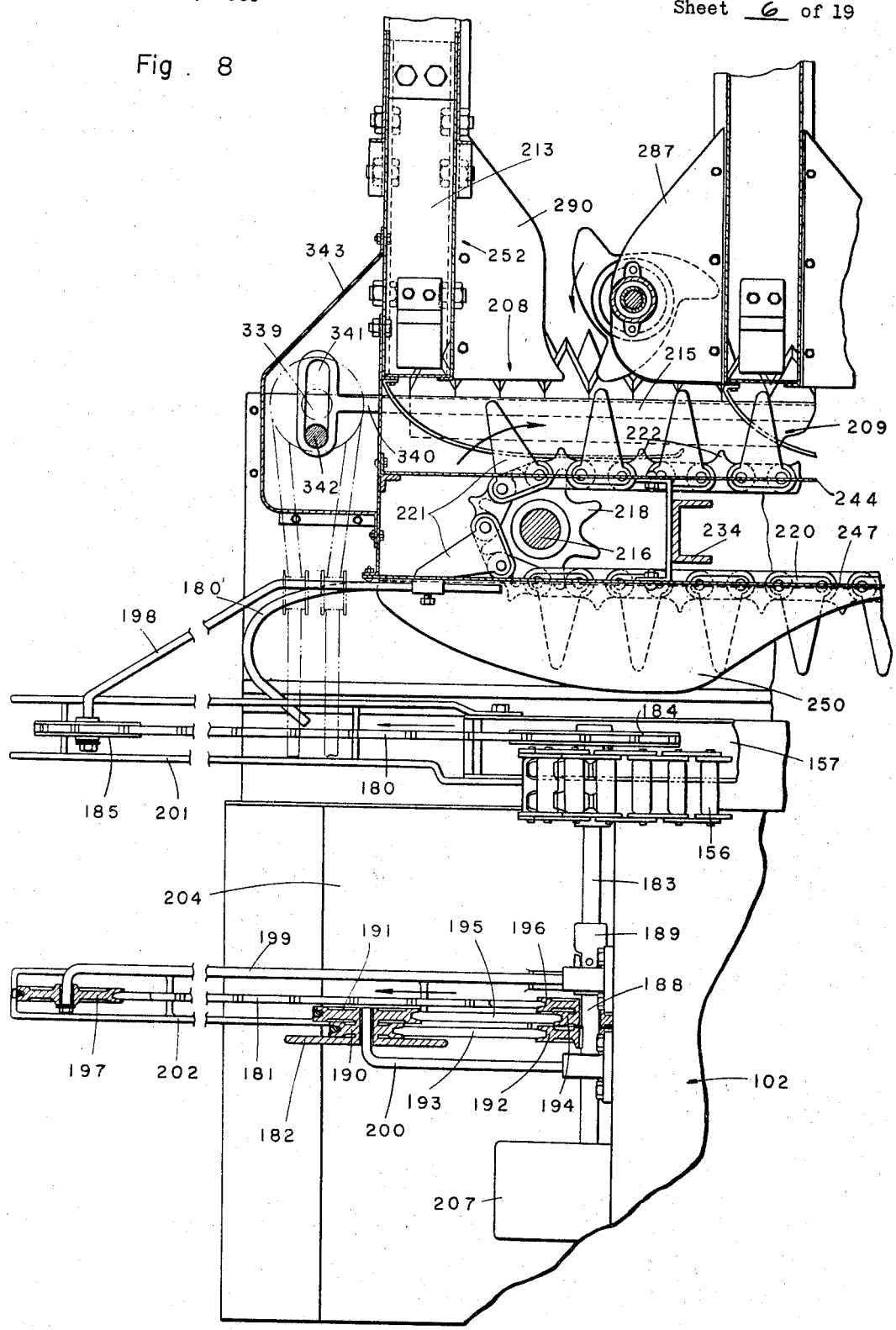

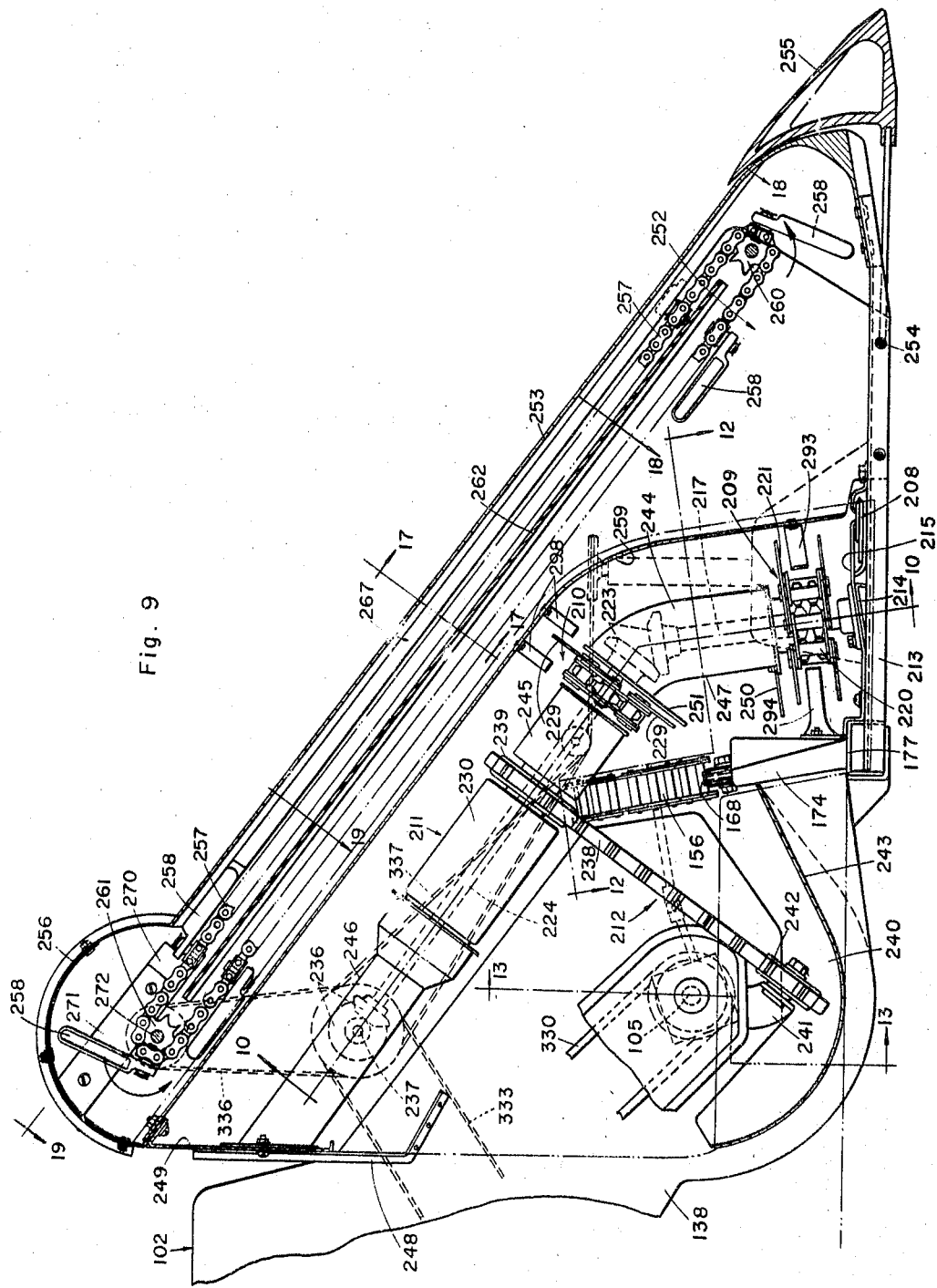

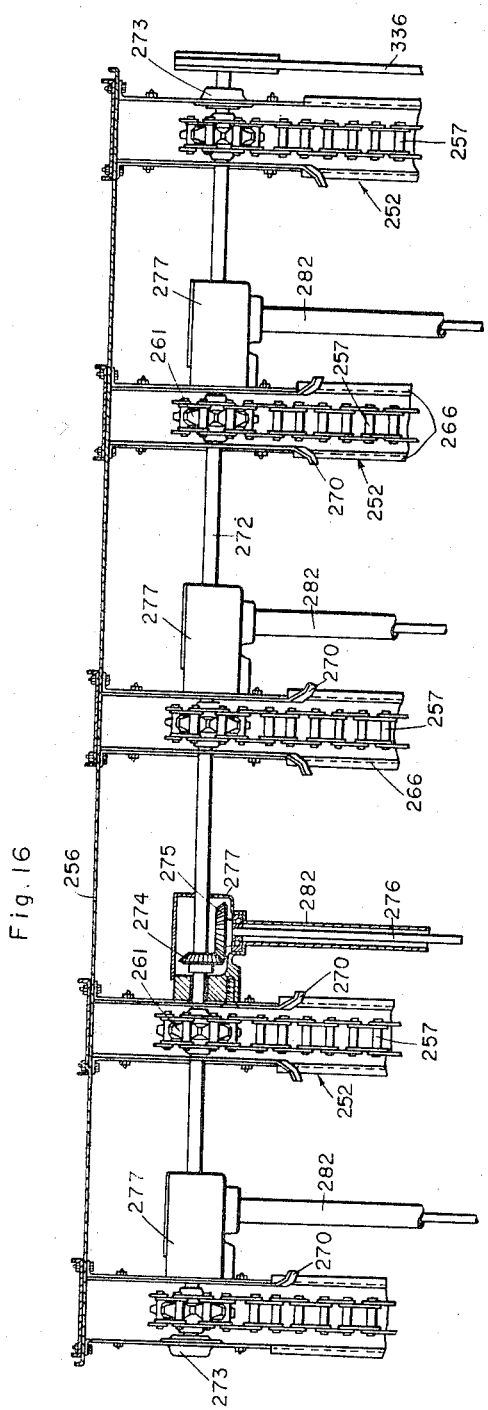
Fig. 16
Fig. 23
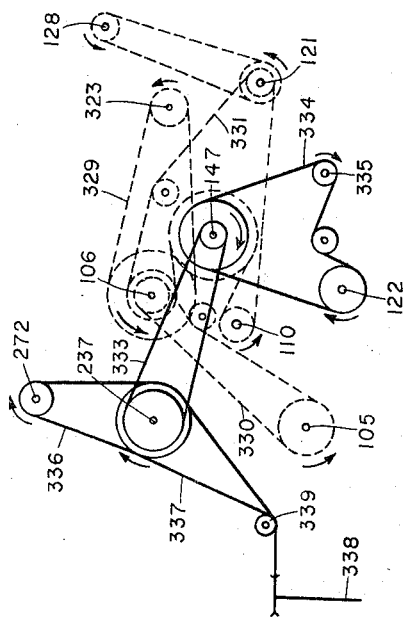

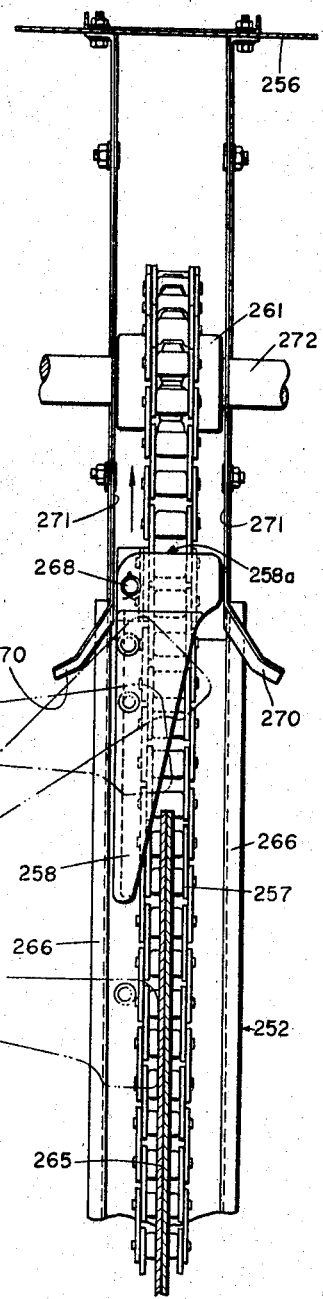
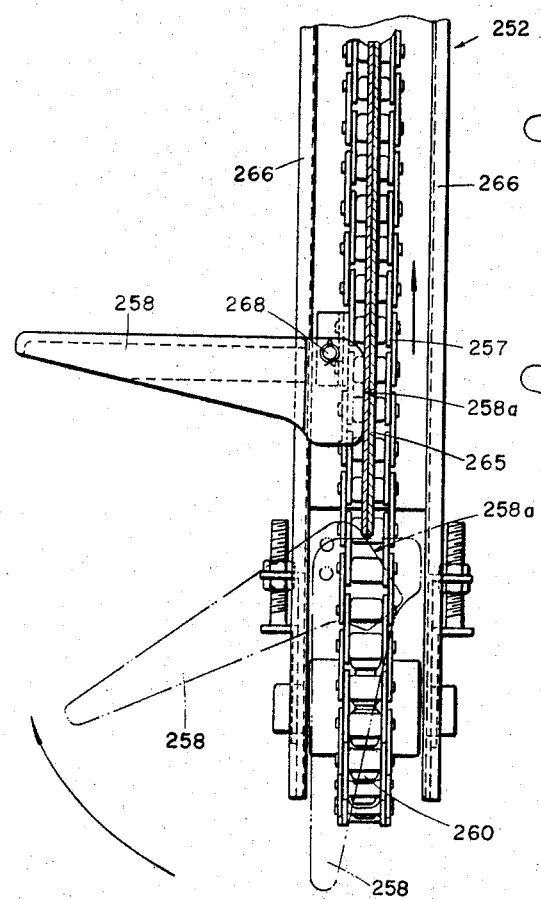
Fig. 18
Fig. 19

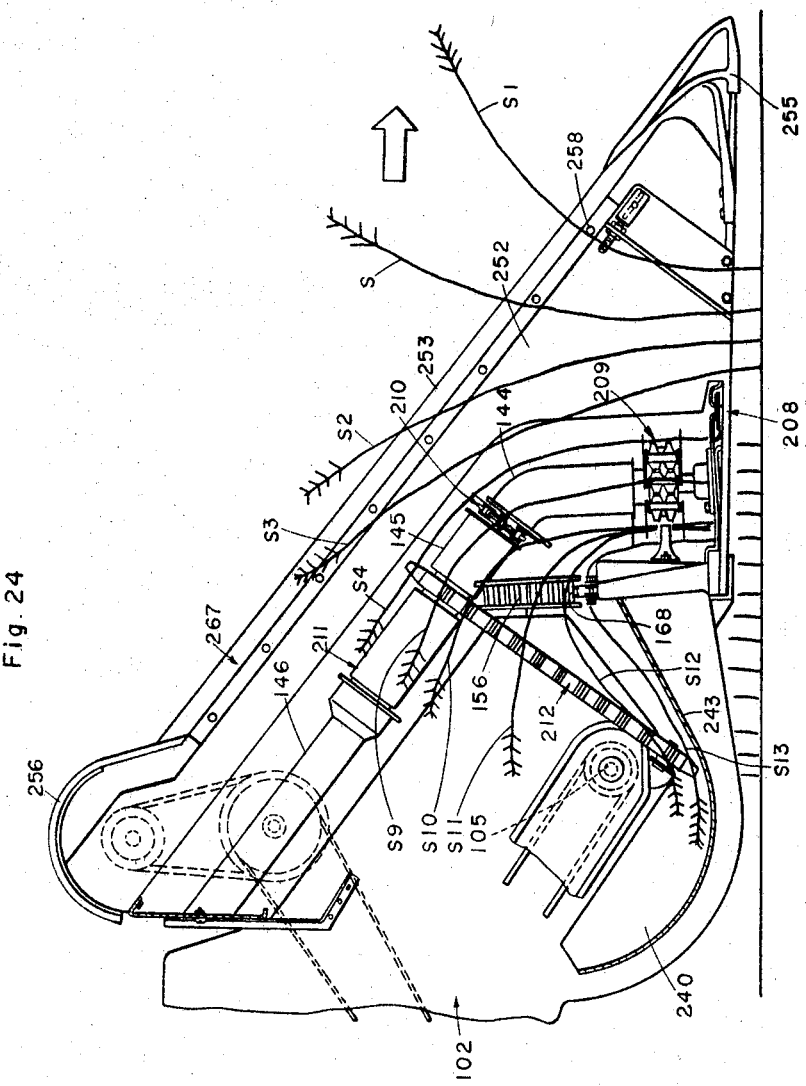

United States Patent Office
3,423,910
Patented Jan. 28, 1969

3,423,910
HARVESTER COMBINE
Takatsugu Shimamoto, Osaka, Shota Hiyamuda, Sakai, Shigeru Fujita, Shimo-ito, Akihiko Nozoe, Sakai, Hiromi Yamaguchi, Izumisano, and Jutaro Eguchi, Sakai, Japan, assignors to Kubota Tekko Kabushiki Kaisha, Osaka, Japan, a company of Japan
Filed June 30, 1965, Ser. No. 468,452
Claims priority, application Japan, Nov. 11, 1964, 39/64,185
U.S. Cl. 56—20
Int. Cl. A01d 41/02, 45/30; A01f 12/20
31 Claims

ABSTRACT OF THE DISCLOSURE

A combine for grain in which the harvested stalks are delivered in an upright position onto an inclined guide surface, and fed across this surface transversely to the direction of travel to a further conveying means which holds the stalks while feeding the heads thereof through a threshing assembly. The threshing assembly includes a threshing drum, a separating drum, a beater located between the two drums and a separating chamber and grain sieve located below the separating drum and acted upon by blowers for separating grain from trash material. Threshed stalks are conveyed to an axiliary separating assembly where the stalks are spread, shaken, and finally discharged from the combine in a desired orientation relative to the path of travel.

---

This invention relates to improvements in Harvester Combines, especially combines for the havesting and threshing of grain.

The principal objects of the invention are to provide a harvester combine having an improved grain separating ability and which is relatively compact in size and light in weight in comparison to conventional combines of comparable capacity. Another object is to provide a harvester combine incorporating an improved grain handling system, including both harvesting and threshing components so that even plants such as rice, having irregular growing and standing habits, can be efficiently handled.

The harvester combine of the invention includes a cutting assembly extending transversely across the front portion of the machine and acting in conjunction with grain stalk pickup and feeding mechanism which divides the swath of grain stalks being harvested into a plurality of paths, which straightens bentover stalks while simultaneously positively feeding them through the cutting mechanism and delivers the harvested stalks to a further feeding means for transferring them to a grain threshing assembly. Preferably, the harvested stalks are delivered from the cutting assembly onto a rearwardly inclined surface with the grain-head portion of all stalks arranged in the same relative position thereon, and the further feeding means conveys the harvested stalks across this inclined surface to a grain stalk holding and transfer means which conveys the stalk through the threshing assembly.

The threshing assembly includes a housing having a drum rotating therein for combing grains off the stalk heads, with an inlet opening in the housing adjacent one end of the drum and a discharge opening disposed near the other end thereof. A passage extends along the housing between the inlet and discharge openings, and the grain stalks are conveyed along this passage with the grain heads thereof extending into the housing for threshing action by the drum.

The threshed stalks are then preferably delivered by the grain stalk holding and transfer means to an auxiliary grain separating assembly which acts to spread the stalks apart, shake the stalks to remove any grain clinging thereto and discharge the stalks from the machine in a desired orientation relative to the path of machine travel.

Preferably the threshing assembly includes threshing drum and separating drum, the separating drum being located rearwardly and above the threshing drum with a beater being interposed between the two drums. A grain separating chamber is provided rearwardly and below the separating drum, and means are provided therein including a movable grain sieve and blowers for further separating grain from trash material, for delivering the threshed grain to a grain storage tank and for discharging the trash material to the outside.

Preferably also, the harvester combine of the invention is provided with a running assembly of the endless tread type, and the main frame of the machine is connected to the frame of the running assembly so that the relative vertical spacing between these frames can be altered at the will of the operator to change the cutting height, and to facilitate the discharge of grain from the grain tank.

Other features and advantages of the invention will become apparent from the following description of the embodiment disclosed in the attached drawings in which;

FIGURE 3a is a longitudinal sectional view of a grain separating assembly housing, built in the embodiment of FIGURE 1, with the divider part removed;

FIGURE 3b is a side view of the divider part removed from the embodiment of FIGURE 3a;

FIGURE 4 is a perspective view showing the construction of the grain separating assembly housing and grain tank constituting the embodiment of FIGURE 1, with some parts thereof removed;

FIGURE 5 is a longitudinal sectional view of a grain sieve employed in the embodiment of FIGURE 4;

FIGURE 6 is a sectional view on an enlarged scale taken along the line 6—6 of FIGURE 3a;

FIGURE 7 is a perspective elevation showing an auxiliary grain separating assembly constituting the embodiment of FIGURE 1;

FIGURE 8 is a sectional view on an enlarged scale taken along the line 8—8 of FIGURES 3a and 3b;

FIGURE 9 is a partially removed longitudinal sectional view showing on an enlarged scale the grain stalk pick-up assembly and grain stalk transfer assembly;

FIGURE 13 is an enlarged sectional view taken along the line 13—13 of FIGURE 9;

FIGURE 16 is an enlarged sectional view taken along the line 16—16 of FIGURE 3a;

FIGURE 18 is a sectional view on an enlarged scale taken along the line 18—18 of FIGURE 9;

FIGURE 19 is a sectional view on an enlarged scale taken along the line 19—19 of FIGURE 9;

FIGURE 23 is a schematic side view showing power transmission system by belting of this invention;

FIGURES 24 and 25 are schematic side views illustrating the operation of the grain stalk pick-up as well as grain stalk feeding mechanism;

GENERAL CONSTRUCTION

Figure 1:
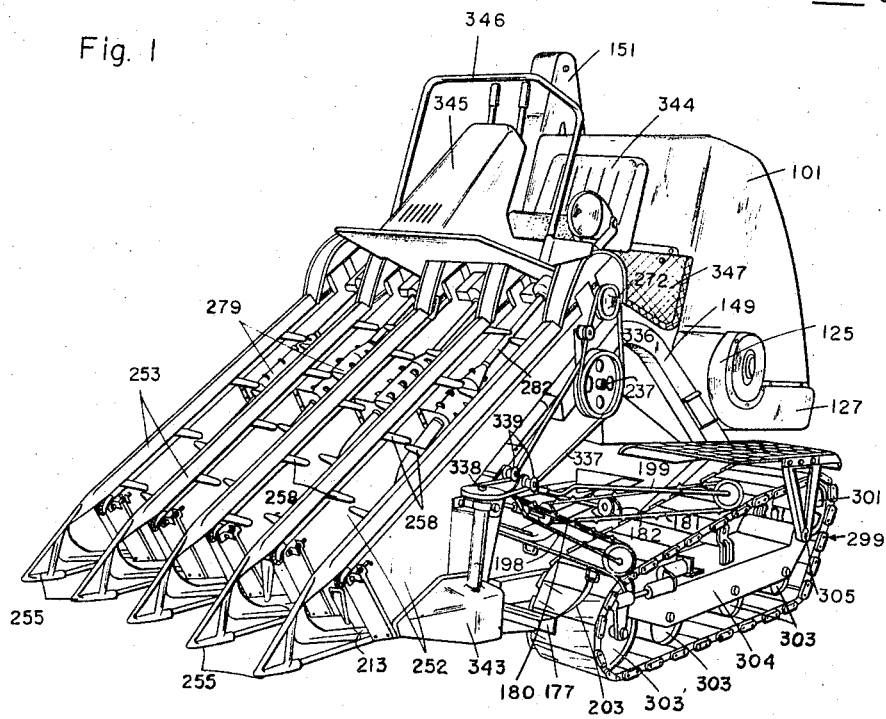
FIGURE 1 is a front perspective view of a harvester combine embodying the principles of this invention.

Referring now to the drawings, the self-propelled harvester combine embodying the principles of this invention mainly comprises of a grain separating assembly contained in a housing 102 (FIGS. 3a, 4) which is mounted on a main frame 300 occupying the rear central section of the machine; a self-propelled running gear assembly consisting of two crawler units 299 (FIGS. 1, 20), one of which is disposed on each side of said main frame 300; a grain stalk cutter assembly consisting of a reciprocating cutter unit 208 (FIG. 11) extending transversely across the whole width of front frames 213 which project longitudinally on the machine from the front transverse beam 177 of said main frame 300; a grain stalk transfer assembly consisting of a plurality of conveyor units 221, 210, 238, and 230 (FIG. 11) which are transversely disposed between said grain separating assembly housing 102 and the grain stalk cutter assembly substantially across the whole width of the housing 102; a grain stalk holding transfer assembly consisting of endless chain conveyors 158 and 212 (FIGS. 6, 9), of which the conveyor 158 is transversely disposed between the grain stalk transfer assembly and the grain separating assembly housing 102 across the whole width thereof, and the other endless chain conveyor 212 is disposed laterally and operatively associated with said endless chain conveyor 158; a grain stalk head portion feeding assembly consisting of an endless belt conveyor 168 operatively associated with said grain stalk holding transfer assembly; a grain stalk pick-up assembly consisting of a plurality of endless chain conveyor units 257 (FIGS. 9 and 15) each of which is housed in its respective casings 252 longitudinally disposed and upwardly and rear-wardly inclined in such a manner as to overhang the frontal section of the grain separating assembly housing 102; an auxiliary grain separating assembly consisting of two differential endless belt conveyors 180 and 181 (FIGS. 1 and 7) which are transversely disposed on a grain recycling plate 204 laterally extending from the discharge side of the grain separating assembly housing 102; and a grain tank 101 (FIGS. 2 and 3a) which is disposed in such a manner as to substantially overhang the upper rear section of the grain separating assembly housing 102.

GRAIN SEPARATING ASSEMBLY

The grain separating assembly of this invention is shown particularly in FIGURES 3a and 4. The grain tank 101 is mounted on the upper rear section of the grain separating assembly housing 102. Parallelly spaced grain threshing drum 103 and separating drum 104 are transversely disposed respectively in the lower and the upper frontal section of the grain separating assembly housing 102 across the whole width thereof. Said grain threshing drum 103 and said grain separating drum 104 are rotatably mounted between the side walls of the grain separating assembly housing 102 by means of transverse driving shafts 105 and 106. The grain threshing drum 103 and grain separating drum 104 are each provided on their entire active surface with inverted V-shaped grain threshing teeth or projections 107, and separating teeth or projections 108 which are made of steel wire and suitably spaced from one another. The teeth 107 are spirally inclined in respect to the rotative direction of the said drum 103. A beater 109 is transversely disposed in the space between the grain threshing drum 103 and the grain separating drum 104 is rotatably mounted between the side walls of the grain separating assembly housed 102 on a driving shaft 110. A plate 111 forms the bottom wall or deck of the grain separating assembly housing 102 and underlies the lower half portion of the spherical active surface of the grain threshing drum 103 at a suitable distance from the ends of the grain threshing teeth 107. On the inner surface of plate 111 are mounted abutment members 112, each of which occupies an intermediate space between the parallel spaced grain threshing teeth 107 so as not to interfere with the rotatory movement of the grain threshing drum 103. It is preferable that the abutment members be spirally arranged along the axis of rotation of said main threshing drum 103 so as to have the ability to move the separated grains in the direction the grain stalks are moved. A shield 113 integrally formed with the plate 111 extends rearwardly towards the grain separating drum 104 in such a manner as to underlie the beater 109 and the lower rear section of the grain separating drum 104. Wire mesh panels 114 and 115 are secured to the plates 111 and 113 to form grain sieves overhanging the lefthand upper rear section of the grain threshing drum 103 and underlying the lefthand lower front section of the grain separating drum 104 in such a manner that the grain sieves 114 and 115 form a substantially continuous path relative to the beater 109. Although not shown in the drawings, there is also provided a central section plate laterally from the beater 109 for forming said path in cooperation with the said sieves.

The upwardly extending rear side wall 116 of the grain separating assembly housing 102 is shaped to form screw conveyor troughs 119 and 120 for screw conveyors 117 and 118 which are rotatably mounted between the side walls of the grain separating assembly housing 102 across the whole width thereof by means of transverse driving shafts 121 and 122. A blower 123 is encased in the rear bottom section of the grain separating assembly housing 102, with a discharge aperture 124 therefore opening into the upper frontal portion of the screw conveyor trough 120. Suction blower 125 is provided on the upper outside corner of the side wall of the housing 102, having a suction duct 126 opening into the housing 102 through said wall and an exhaust passage 127 opening to the outside of the said housing 102. A shaft 128 drives the blower 125.

A grain sieve 129 is provided across the whole width of the grain separating assembly housing 102 below the separating cylinder 104 and overhanging the screw conveyor trough 120 for separating grains from tailings and fragments of straws and comprising an upper sieve 131 and a lower sieve 132 secured to the side plates 130 which are movably positioned adjacent to the side walls of the grain separating assembly housing 102. As shown in FIGURE 5, the upper sieve 131 comprises a plurality of transversely spaced angle slats 133, and the lower sieve 132 is made of a plate 134 having a plurality of longitudinal apertures 135 and upturned flanges 136 integrally associated with said apertures 135. Both sieves 131 and 132 are positioned in a partially overlapping relation, the upper sieve 131 substantially underlying a transverse separated material-discharging aperture 137 which is provided as shown in FIGURES 3a and 4 in the grain shield plate 113 at the rear section of the grain separating drum 104 from the beater 109.

As shown again in FIGURE 5, the side plates 130 of the grain separating sieve 129 are movably associated with the lower ends of differential rocking arms 139 and 140 by means of pins 141 and 142 engaging slots 143 provided in the side walls 138, the arms 139 and 140 being movably attached at their other ends to said side wall 138 from the outside thereof. Pin 141 is connected with the eccentric ring 145 of a cam mechanism 144 by means of rod 146, which mechanisms 145, 144 and 146 are mounted outside the side wall 138 on a driving shaft 147. Thus the grain separating sieve 129 is actuated to rock up and down, back and forth, by way of said pins 141 and 142 and rocking arms 139 and 140. Underneath the lower sieve 132, there is provided a slightly tilted grain flowing plate 148 transversely fixed to the side plates 130.

Referring again to FIGURES 3a and 4, a grain lifter 149 is fixed to the outside lefthand side wall of the grain separating assembly housing 102 in association with the screw conveyor driving shaft 121 and which is adapted to transfer the grain discharged from the trough 119 by the action of the screw conveyor 117 to a grain separating drum chamber 150. A grain elevator 151 fixed to the outside righthand side wall of the grain separating assembly housing 102 in association with the screw conveyor shaft 122 is adapted to elevate into the grain tank 101 the grain discharged from the trough 120 by the action of the screw conveyor 118. Inside the grain tank 101, there is provided another screw conveyor 152 co-acting with said grain elevator 151 (FIG. 4), and adapted to uniformly spread the elevated grain throughout the grain tank 101. A shutter 153 (FIG. 3a) is provided at grain delivery aperture in the lowest portion of the rear wall of the grain tank 101.

GRAIN STALK HOLDING AND TRANSFER ASSEMBLY

As shown in FIGURE 3a, the frontwall plate 154 of the grain separating assembly housing 102 overhanging the grain threshing drum 103 is adapted to form an aperture 155 for the transverse feeding of the grain stalks in association with the deck plate 111. Laterally of said aperture 155, there is provided a grain stalk holding transfer assembly 158 of this invention secured to said plate 154.

Figure 6:
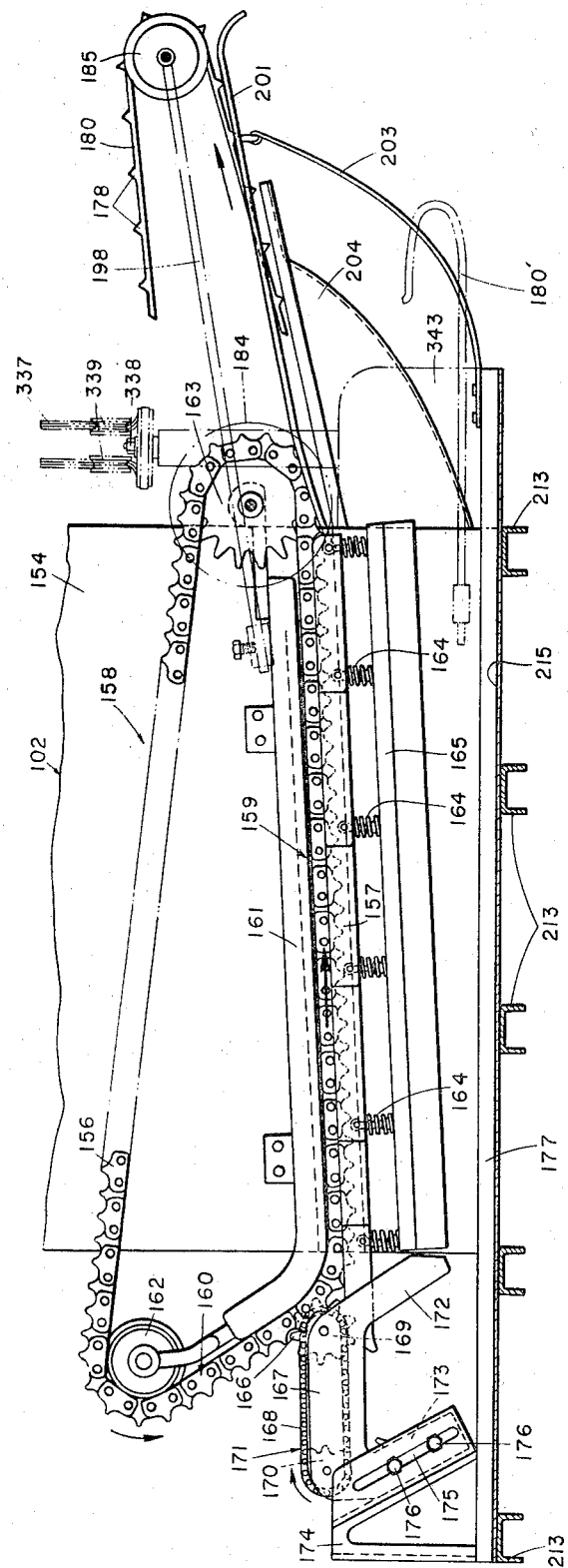

The grain stalk holding and transfer assembly of this invention, as shown in FIG. 6, is mainly constituted by a primary endless feed chain conveyor 156 and a secondary endless chain conveyor 171. The primary conveyor 156 extends around driving sprocket 163 and guide wheel 162 in such a manner as to form a downwardly inclined active run 160 and a lower transverse active run 159 for the transfer of the incoming feed in association with a stationary guide rail 161 and a resiliently mounted active guide rail 157. The stationary guide rail 161 is fixedly secured to the downwardly extending front flange 154 of the grain separating assembly housing 102 and rotatably supports the driving sprocket 163 and the guide wheel 162. The active guide rail 157 is supported by resilient means 164 which are disposed between said guide rail 157 and a stationary beam 165 fixedly secured to the downwardly extending front flange 154.

As shown particularly in FIGURE 6, there is provided a sprocket wheel 166 which engages the endless feed chain 156 along the downwardly inclined part 160. The secondary endless chain 168 extends around a guide wheel 170 and sprocket wheel 169 which is coaxial and integral with the sprocket wheel 166 in such a manner as to form an upper running part 171 substantially parallel with the lower running part 159 of the primary endless feed chain 156. Coaxial sprockets 166 and 169 and guide wheel 170 are rotatably mounted on an inverted U-shaped support frame 167 having legs 172 and 173 substantially parallel with the downwardly inclined part 160 of the primary endless feed chain 156. The leg 173 is adjustably supported by means of bolts 176 in a slot 175 provided in a bracket 174 and extending substantially parallel with the downwardly inclined part 160, and the leg 172 is adapted to serve as a guide rail, so that the sprocket 166 is always engaged with the primary endless feed chain 156 along the downwardly inclined part 160, and so that the upper running part 171 of the secondary endless chain conveyor 168 can be shifted up and down relative to the downwardly inclined part 160 by changing the position of the frame 167 along the slot 175, whereby the threshing action and/or combing depth in the separating assembly can be properly adjusted. The bracket 174 is secured to the transverse floor beam 177 of the grain separating assembly housing 102. The afore-mentioned grain stalk holding transfer assembly is further illustrated in FIGURES 12 and 13.

AUXILIARY GRAIN SEPARATING ASSEMBLY

As shown in FIGURES 7 and 8, the auxiliary grain separating assembly of this invention comprises a grain recovering plate 204 laterally extending from the straw discharge side of the machine; primary and secondary differential endless belts 180 and 181 of a length substantially in excess of the whole width of said grain recovering plate 204 and extending across said plate; guide frames 201 and 202 operatively associated with said primary and secondary endless belts 180 and 181; and a differential packer 182 coupled with said secondary endless belt 181. The primary and secondary differential endless belts 180 and 181 are provided on their active surface with projections 178 and 179 spaced at a suitable distance for transferring treated straws laterally to the machine. The primary endless belt 180 extends around a driving pulley 184 and a guide wheel 185. The driving pulley 184 is mounted on the shaft 183 driving the sprocket 163 for driving the endless feed chain 156, and has a substantially larger diameter than said sprocket 163, so that the primary endless belt 180 moves at a speed faster than that of the endless feed chain 156. The driving shaft 183 associates the driving pulley 184 with a shaft 188 through joint 189, and the shaft 188 is driven from the grain threshing drum driving shaft 105 via worm gear 186 and worm wheel 187 contained in a gear box 207 secured to the side wall plate 138.

As shown in FIGURE 8, the differential packer 182 comprises coaxial and integral engaged small and large pulleys 190 and 191, of which the pulley 190 is associated via belt 193 with a pulley 192 keyed to the shaft 188, and the pulley 191 is associated via belt 195 with a pulley 194 which is smaller in diameter than the pulley 192 and rotatably mounted on the shaft 188. The secondary endless belt 181 extends around still another pulley 196 and a guide pulley 197, said pulley 196 being larger in diameter than the pulley 194 and coaxially secured thereto, so that the secondary endless belt 181 moves at a speed faster than that of the primary endless belt 180 by the speed-up action of belts 193 and 195. The guide pulleys 185 and 197 and the differential packer 182 are fixed to the stationary frame of the machine by means of a rod 198 fixedly secured to the front floor frame 177 and by means of rods 199 and 200 bolted to the sidewall plate 138 of the grain separating assembly housing 102. Underneath the differential belts 180 and 181 and in association therewith, there are further provided guide frames 201 and 202. As shown in FIGURE 7, the guide frame 201 is secured at the one end to the stationary feed chain guide rail 157 and at the frontal portion to the front floor beam 177 by means of an interconnecting resilient member 203. The guide frame 202 is fixed at the central portion to the grain recovering plate 204 which extends laterally from a straw discharge aperture 206 having a grain shield 205. As shown in FIGURE 4, the straw discharge aperture 206 is provided in the lower portion of the side plate 138 of the grain separating assembly housing 102 and communicates with the end of the discharge side of the material transfer aperture 155. A stationary straw deflector 180′ (FIGS. 7 and 8) extends from the resilient member 203 is adapted to transversely direct the straws being discharged by checking the butt ends of the straws at the terminal end of the discharge transfer.

GRAIN STALK TRANSFER AND STALKHEAD FEEDING ASSEMBLIES

As shown in FIGURE 9, the harvesting assembly of this invention comprises a transverse reciprocating cutter unit 208 of conventional type; the grain stalk transfer assembly consists of lower conveyor unit 209, intermediate conveyor unit 210 and upper stalk-head conveyor unit 211, all transversely extending the entire width of the grain separating assembly housing 102 and disposed in such a manner as to substantially overhang the grain separating assembly housing 102; and a stalk-head feeding assembly 212 associated with said grain stalk transfer assembly.

In more detail, the reciprocating cutter unit 208 is mounted on an intermediate portion of a plurality of parallelly spaced front frames 213 forwardly extending from the transverse floor beam 177. Between the grain separating assembly housing 102 and the cutter unit 208, there is provided a slightly rearwardly declining transverse support frame 214 which is secured to each of the frames 213 by means of a transverse deck plate 215 having a rear flange fixed to the front section of the floor beam 177 and a front end overhanging the rear section of the cutter unit 208.

Figure 10:
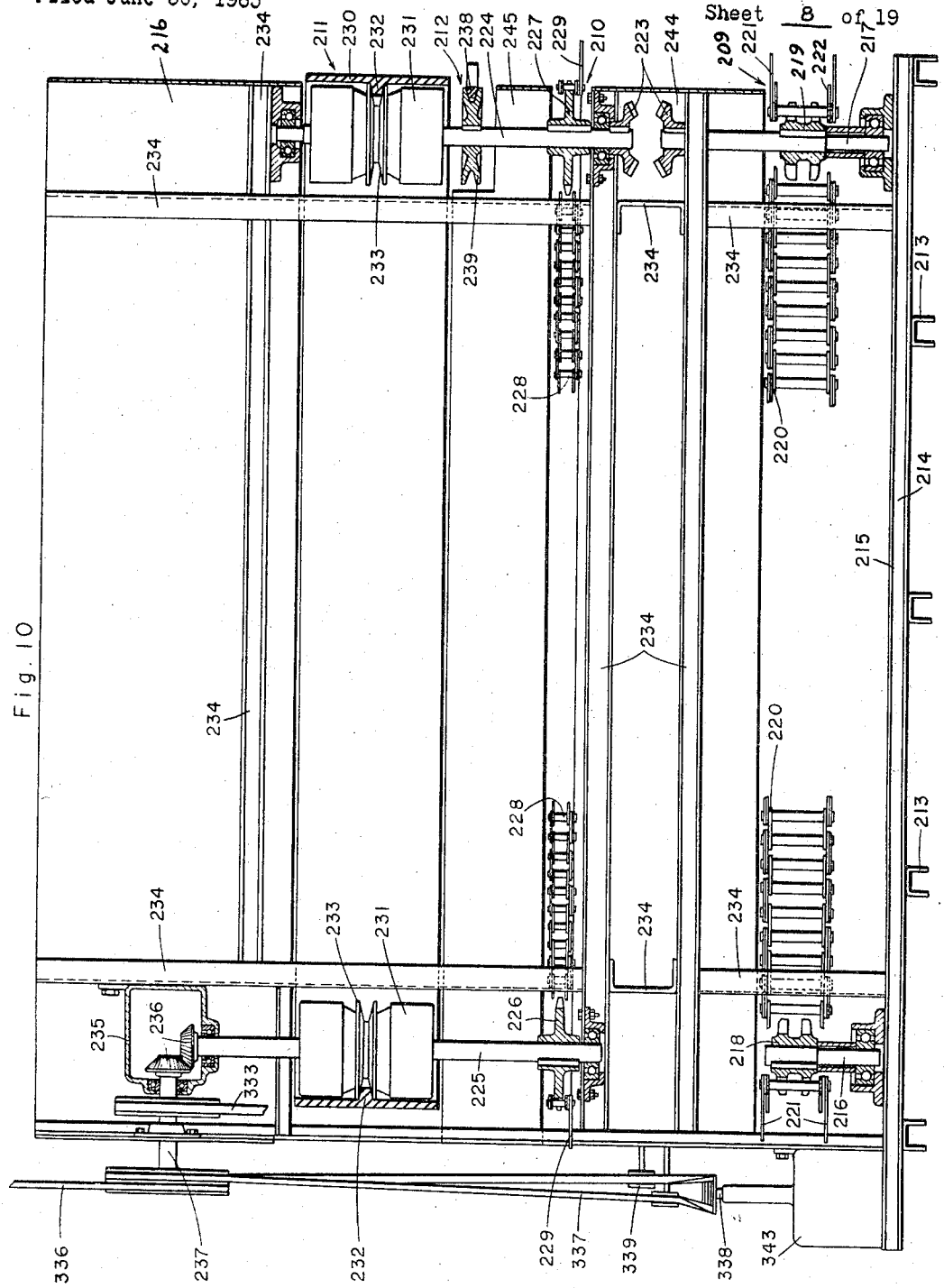
FIGURE 10 is a sectional view taken along the line 10—10 of FIGURE 9.
Figure 12:
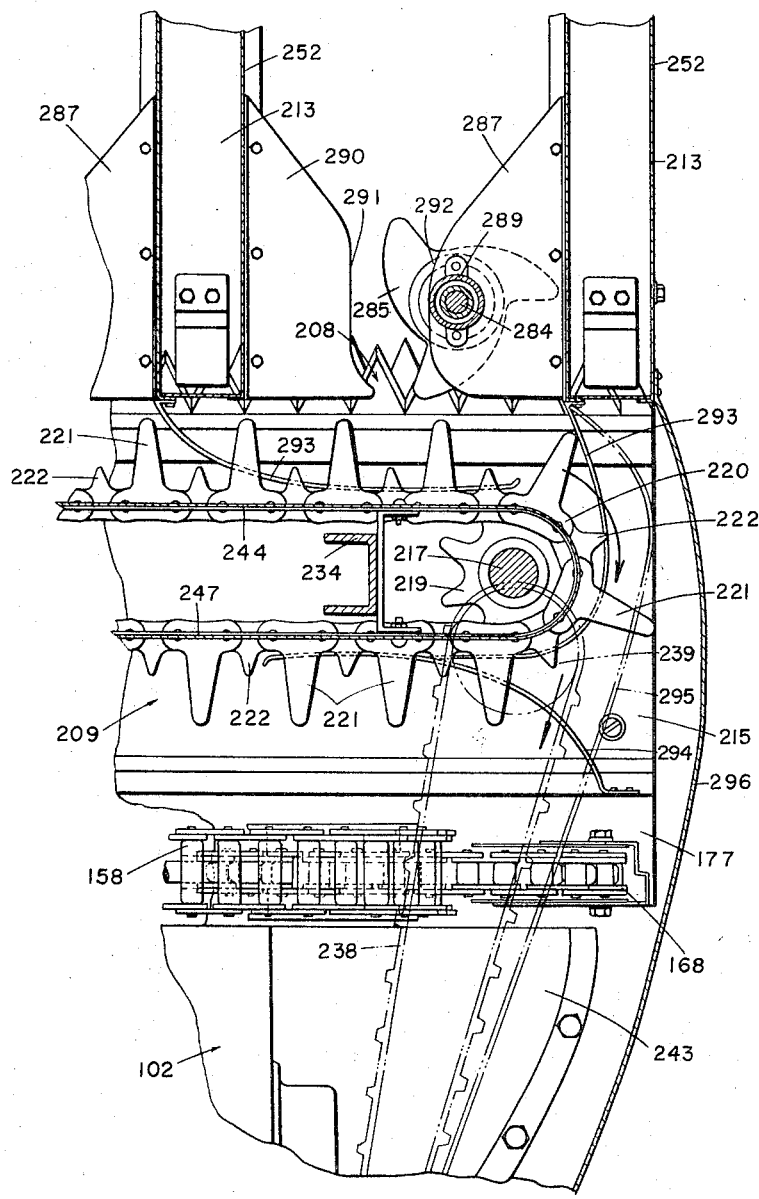
FIGURE 12 is an enlarged sectional view taken along the line 12—12 of FIGURE 9.

Referring now to the grain stalk transfer assembly of this invention, the lower transverse conveyor unit 209 comprises, as shown in FIGURE 10, substantially vertical shafts 216 and 217 rotatably mounted at either end portion of the transverse support frame 214 extending over the whole width of the housing 102; double sprocket wheels 218 and 219 keyed to the shafts 216 and 217; and an endless chain conveyor 220 extending around said sprocket wheels 218 and 219. Each pair of links of the endless chain 220 is integrally provided as shown in FIGURES 8 and 12 with a longer projection 221 and a shorter projection 222 in alternate relation. Since the support frame 214 is slightly tilted down rearwardly, the shafts 216 and 217 vertically mounted thereon are also slightly inclined rearwardly, as shown in FIGURE 9.

Figure 15:
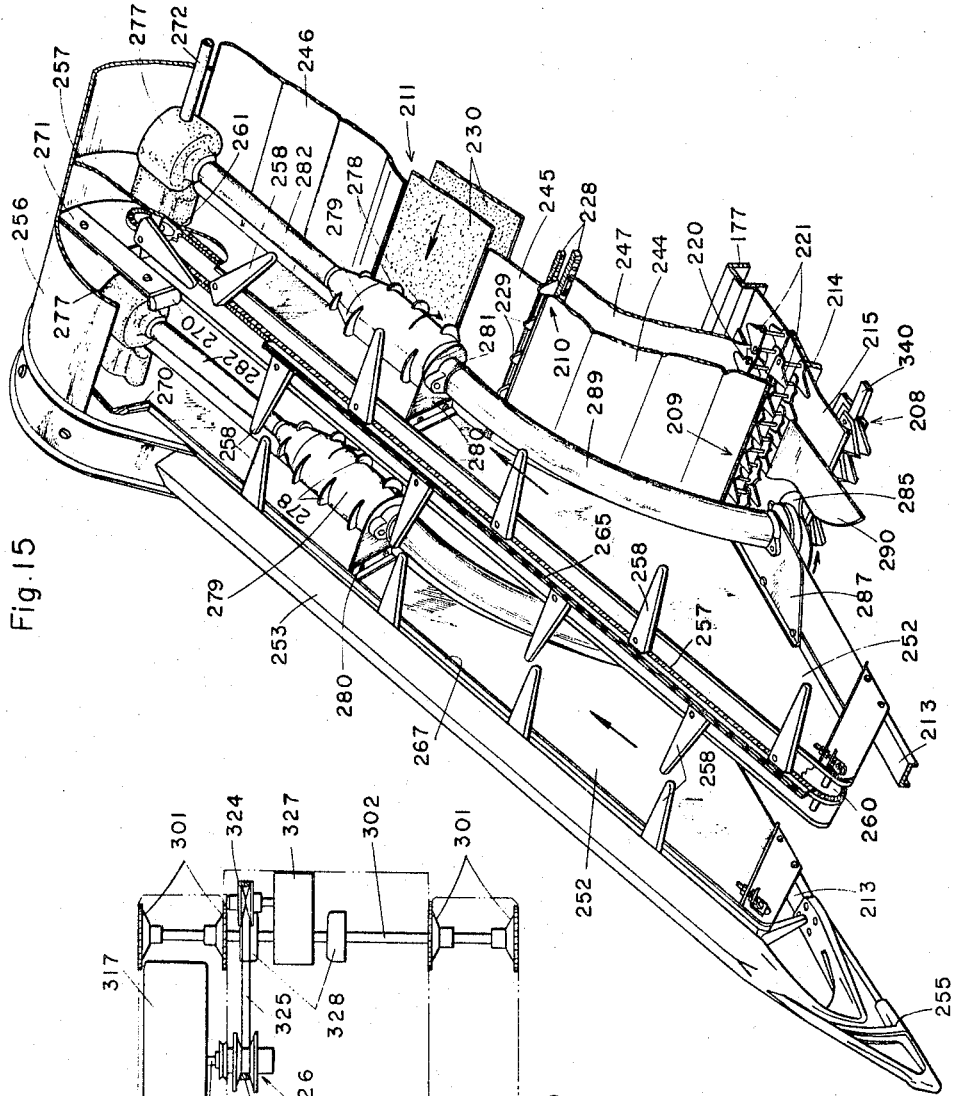
FIGURE 15 is a front perspective view showing a portion of the grain stalk pick-up assembly.

The intermediate transverse conveyor unit 210 comprises, as shown in FIGURE 10, a rearwardly inclined shaft 224 which is operatively associated with said vertical shaft 217 via bevel gears 223; another rearwardly inclined shaft 225 which is operatively disposed above the vertical shaft 216 and positioned in parallel with said shaft 224 in a single plane; sprocket wheels 226 and 227 fixedly mounted on said rearwardly inclined shafts 225 and 224 in this order; and an endless chain conveyor 228 operatively engaged with said sprocket wheels 226 and 227. The endless chain conveyor 228 is further provided with a plurality of suitably spaced projections 229 as shown in FIGURES 10 and 15.

The rearwardly inclined shafts 224 and 225 are inclined at an angle greater than the shafts 217 and 216, and each of said rearwardly inclined shafts 224 and 225 mounts on the intermediate portion thereof, a conveyor drum 231 around which extends an endless flat belt conveyor 230 constituting said upper stalkhead conveyor unit 211. Each of the conveyor drums 231 is provided in the central portion thereof with a V-groove 233 is so adapted as to engage the V-belt guide portion 232 which is integral with the endless conveyor belt 230. The vertical shafts 216 and 217 and rearwardly inclined shafts 224 and 225 are each supported in position by framework 234 which is secured to the support frame 214. To the framework 234 is fixed a bevel gear box 235 containing bevel gears 236 for operatively associating the rearwardly inclined shaft 225 with a driving shaft 237.

Figure 14:
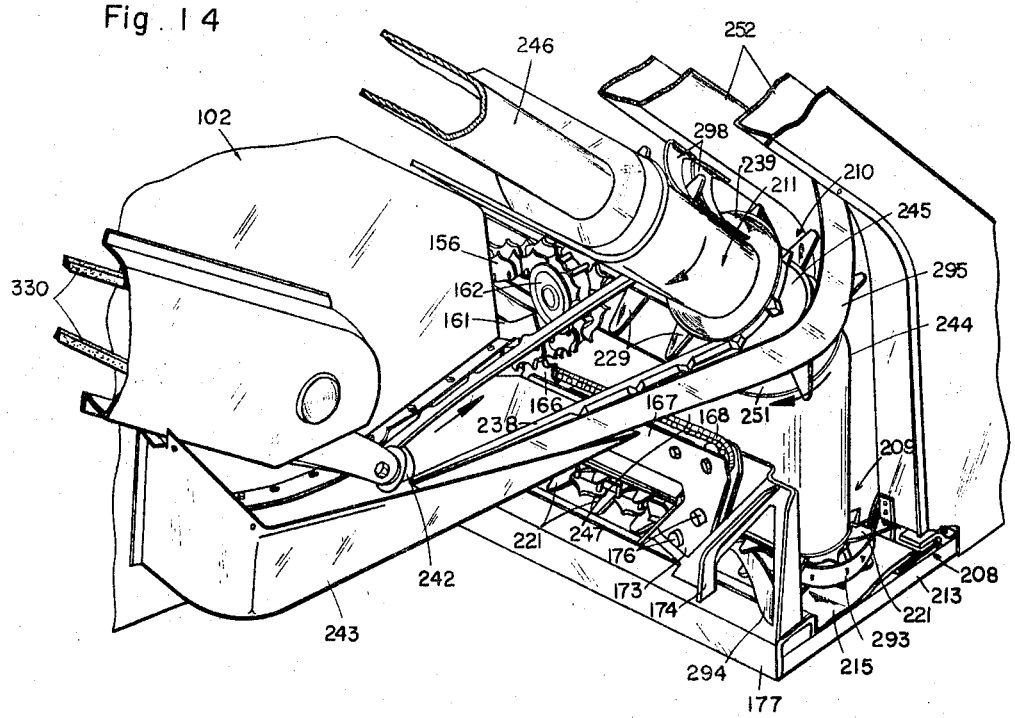
FIGURE 14 is a rear prespective view of FIGURE 13.

The stalk head feeding unit 212 of this invention comprises, as shown in FIGURES 9, 13, and 14, a driving pulley 239, a guide pulley 242, and an endless belt 238 extending around said pulleys. The driving pulley 239 is mounted on the rearwardly inclined shaft 224, occupying the position underneath the endless belt conveyor drum 231. The guide pulley 242 is mounted on a bearing bracket 241 fixed to the side plate 138 of the grain separating assembly housing 102 in such a manner as to face the central portion of the stalk head feeding aperture 240 which is provided in the sidewall plate 138 of the grain separating assembly housing 102. The guide pulley 242 is nearer to the rear and central lower section of the machine than the driving pulley 239 and inside of a stalk head receiving plate 243 which extends laterally from the stalk head supply aperture 240. The endless belt 238 extending around the pulleys 239 and 242 is provided on the active surface with suitably spaced projections.

Referring again to FIGURES 9, 11, 12 and 13, shield plates 244, 245 and 246 are fixed to the framework 234 in such a manner as to overhang the frontal section of said framework, forming a guide plane tilted at the upper portion for the transverse transfer of the cropped grain stalks in cooperation with the active surface of the endless flat belt 230. Projections 221, 222, and 229 of the lower and intermediate conveyor units 209 and 210 also move transversely, lefthandward in the instant embodiment, across the machine as they are projected above said guide plane. Particularly it is preferable that the plate 244 be positioned so as to be substantially normal to the deck plate 215. Since the lower ends of the grain stalks moving along the plate 244 are moved in contact with said deck plate 215, the above-mentioned positioning of the two plates at substantially right angles will prevent the grain stalks from slipping down. The shield plates 244, 245 and 246 have their end portions circularly bent so as to surround said vertical shaft 217 and rearwardly inclined shaft 224. The shield plate 244 in particular is integrally associated with a rearside shield plate 247 protecting the rear section of said conveyor units 209 and 210 as shown in FIGURES 9 and 12. The rearside shield plate 247 is also secured to the framework 234.

As shown in FIGURE 9, the uppermost shield plate 246 and a vertical shield plate 249 are bolted to the housing 102 by a bracket 248. A plate 250 shown in FIGURE 8 is integrally connected to the lower rim of the shield plate 247 and is adapted to release the grain stalks being transferred from the projections 221 and 222 at the reverse turn of the lower conveyor unit 209. To release the grain stalks from the intermediate conveyor unit 210, there is provided a plate 251 (FIGS. 13 and 14) which is integrally connected to the upper rim of the shield plate 247 (FIG. 11) and adapted to release the grain stalks at the reverse turn of the projections 229.

PICK-UP ASSEMBLY

The crop or grain stalk pick-up assembly of this invention consists of a plurality of upwardly inclined pick-up units, each of which comprises, as shown in FIGURE 9, of a casing 252 having the front portion (removable) mounted on each frame 213 and the rear portion (removable) attached to the vertical shield plate 249 of the grain separating assembly housing 102; a divider 255 which swings vertically in a limited range and mounted movably on the front end of said frame 213 by means of a pivot 254; an endless chain 257 extending around sprocket wheels 260 and 261 positioned in each of the casings 252; and pick-up members 258 operatively associated with said endless chain 257. The endless chains 257 and the upper edges of the casings 252 are each substantially parallel with and spaced from said plates 245 and 246, and the rear side plate 259 of each of the casings 252 is parallelly spaced at a suitable distance from the shield plates 244, 245, and 246. Member 262 is a chain receiver plate longitudinally and transversely secured to the side plates 266 of each of the casings 252.

Figure 17:
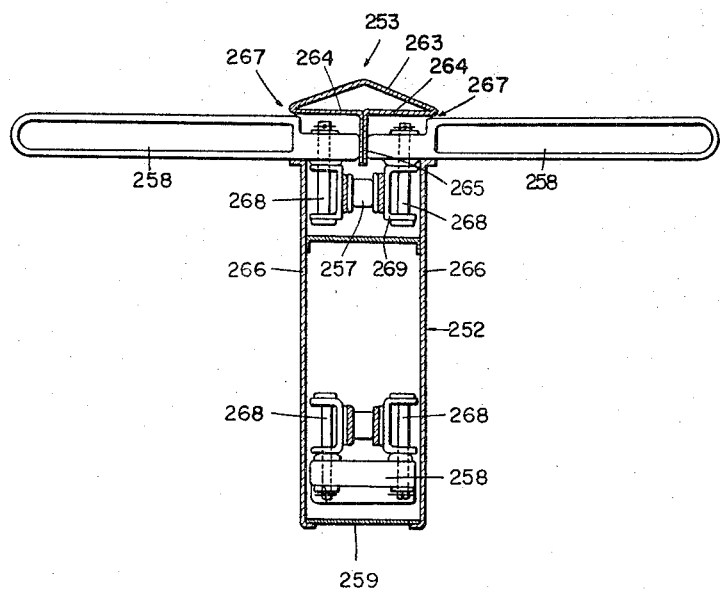
FIGURE 17 is a sectional view on an enlarged scale taken along the line 17—17 of FIGURE 9.

The outer cover 253 of each of the casings 252 is, as shown in FIGURE 17, made of a continuous plate 263 folded into a frame having a T-shaped or triangular cross section with either side portions 264 integrally joined to form a single longitudinal vertical cam plate 265. The lower end of the cover 253 is engaged with said frame 213 in such a manner as to allow the cam plate 265 to come in line with the central axial line of the casing 252 and in such a manner that it forms a longitudinal slot 267 on each side of the cam plate 265 for allowing said pick-up member 258 to pass through.

Referring to FIGURE 17, one end of each of the pick-up members 258 is mounted on a pin 268 which is rotatably supported by a bracket 269 secured to the side plate of the endless chain 257. The pin 268 is situated in perpendicular relation to the longitudinal direction of the endless chain 257 and substantially parallel with the side plates 266 of the casings 252. The pick-up members 258 are spaced on side plates of the endless chains 257 in staggered relation and at a suitable distance from one another as shown in FIGURE 15. In the case of each of the extreme side casings of the machine however, said pick-up members are provided only on the internal side plates of an endless chain 257.

As shown in FIGURE 18, each of the pick-up members 258 is adapted to come into contact with the cam plate 265 in such a manner that the active face 258a of each of said pick-up members 258 extends rearwardly of vertical pin 268 relative to the direction of the movement of the endless chain 257. The faces 258a are substantially smaller in width than the internal width of each of the casings 252, so that any of the pick-up members 258, when idle, can be retracted within the casings 252 as shown by dotted lines in FIGURE 19.

As shown in FIGURE 15, the pick-up members 258 are so arranged in length and spacing that when the members are projected through the adjacent casings by action of the cam plate 265, their opposed free ends may be brought close to each other, and the members may be rotated to their original position after they are projected. A blade deflector 270, shown in FIGURE 19, is provided on side plates 266 of each of the casings 252 at a substantial distance ahead of the cam plate 265 and is adapted to fold the pick-up members 258 one after another into the casing 252 at the terminal point of the active run in an easy manner and without mechanical shocks. The deflectors 270 are secured to the side plates 266 of each of the casings 252 by a bracket 271. In the case of the extreme side casings, however, only one deflector is provided on the internal side plate of each of the casings, as shown in FIGURE 16. Semi-cyclindrical shield plates 256, shown in FIGURE 9, are each substantially coaxial with the upper sprocket wheel 261 and connected to the casing lid 253, to afford ample space for the overturning reverse movement of the pick-up members 258 at the upper terminal run of each of the endless chains 257. Substantially the same space provisions are made at each of the lower sprocket wheels 260 where the pick-up members turn around to their operating position.

Referring now to FIGURE 16, each of the upper sprocket wheels 261 are operatively associated with a single driving shaft 272 which is journaled at 273 in the lateral side plate of each of the extreme side casings. Between the casings, the driving shaft 272 is operatively associated with a drum packer driving shaft 276 via bevel gears 274 and 275 which are contained in a gear box 277 bolted to one of the side plates of each of the casings.

Figure 11:
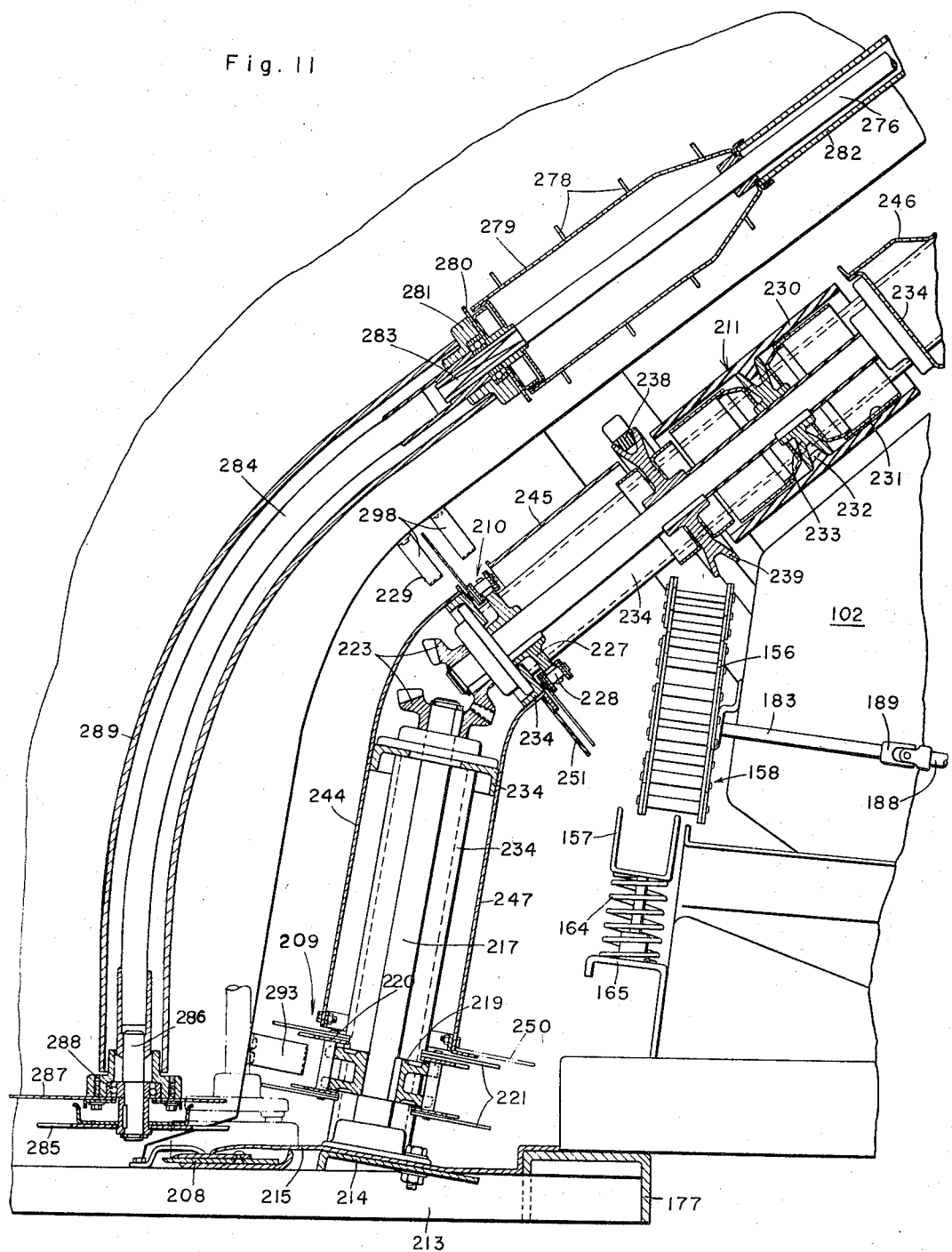
FIGURE 11 is a longitudinal sectional view showing on an enlarged scale the grain stalk transfer assembly.

As shown in FIGURE 11, each of the drum packer driving shafts 276 is coaxially connected to a drum packer 279, one end thereof being journaled in a bearing assembly 281 secured to a bearing plate 280 which is fixed to the side plate of the casing. A cylindrical member 282 shown in FIGURES 11 and 16 surround the packer driving shaft 276 so as to prevent the latter from winding up the material which is being fed. Each of the drum packers 279 are provided on their active surface with projections 278 spaced from the endless flat belt 230 so as to constitute a continuous transfer passage in association with said belt 230.

As shown in FIGURE 11, a terminal extension 283 of each of the drum packer driving shafts 276 is engaged with a flexible shaft 284 which is connected to the driving shaft 286 of a plate packer 285 journaled in a bearing assembly 288 secured to a bearing plate 287 which in turn is secured to the side plate of each of the casings in such a manner that each of the plate packers 285 is disposed between the casings 252 and occupies a position slightly above and in front of the transverse reciprocating cutter unit 208. A cylindrical member 289 covers the entire length of each of the flexible shafts 284 so as to prevent the latter from the winding of the material being fed.

Referring to FIGURE 12, members 290, are stationary guide plates, each of which is secured to one of the side plates of each casing 252 opposite to the plate packer mounted thereon and on the same level as each of the bearing plates 287. The size of said plate 290 is such that it will not overlap the rotary path of each plate packer so as to define a grain stalk guide passage between the rim 291 of each of the guide plates 290 and the rim 292 of each of the bearing plates 287. Members 293 (FIGS. 9, 12) are resilient guide plates, each of which is suitably secured to the rearside plate 259 of each of the casings 252 with the free end interposed between the upper and lower rows of the projections 221 of the lower conveyor unit 209, and which is adapted to hold the grain stalks being fed into the conveyor unit 209 in position. A resilient guide plate member 294 is suitably secured to said frame 177 adjacent the bracket 174 with the free end interposed between the upper and lower rows of the projections 221 of the lower conveyor unit 209, and is adapted to hold the material being fed on the reverse turn in position, in cooperation with the extreme lefthand resilient plate 293. When the resilient plate 294 is so arranged as to extend along substantially the entire length of the return path of the lower transverse transfer unit 209, the resilient plate 294 and the return path portion of the lower transverse transfer unit 209 may serve both as such and as a grain stalk holding conveyor according to the invention. In this case, the guide rail 157 or other member performing substantially the same functions may be utilized as the resilient plate 294.

Figure 2:
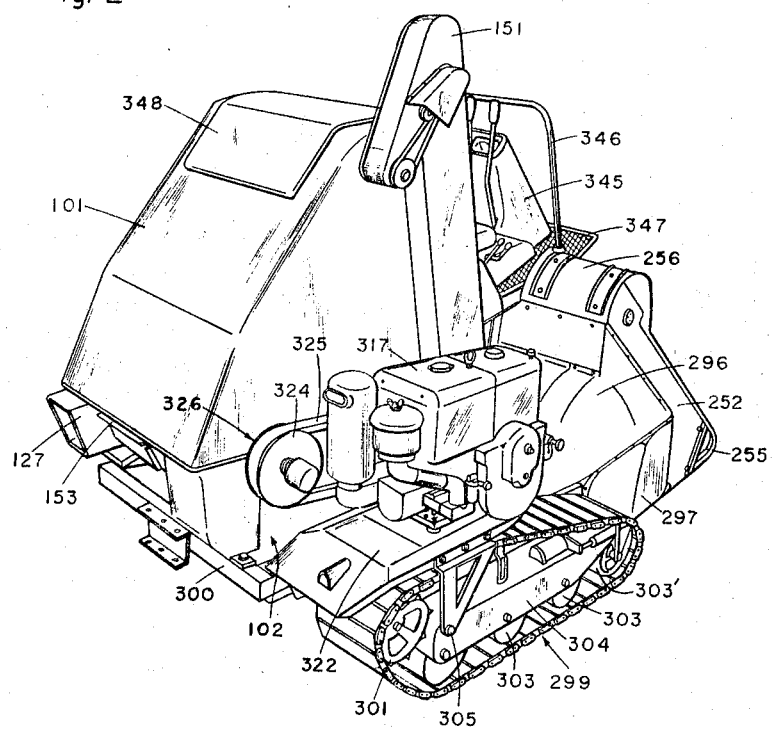
FIGURE 2 is a rear perspective view of the embodiment shown in FIGURE 1.

Referring to FIGURES 12 and 13, member 295 is a shield plate having one end secured to the rear side plate of the extreme lefthand casing and extending along the endless belt 238 of the stalk head feeding unit 212. Member 296 is also a shield plate having one end releasably secured to the lateral flange of the stalk head receiver plate 243 and the other to the rear side plate of the lefthand side casing. Member 297 is a shield plate releasably secured to the bottom flange of said shield plate 296 and to said lefthand side casing. The outer view of the machine embodying the shield plates as specified is also shown in FIGURE 2. In FIGURES 6, 9 and 14 are shown the embodiment with these shield plates removed for illustrative purposes.

Each of the casings 252, is provided on the rearside plate with a resilient guide plate 298 (FIGS. 9, 11, 14) having the forked free ends operatively intercepting the projections 229 of the intermediate conveyor unit 210 so as to increase the working effect of said unit 210.

RUNNING GEAR ASSEMBLY

As shown in FIGURES 1 and 2, the running gear assembly of this invention consists of two identical crawler units, one disposed on each side of the machine. The following description is accordingly confined to the specification of the lefthand crawler unit, but the description may also be applied without substantial modification to the righthand crawler unit which is essentially identical in construction and function.

Figure 20:
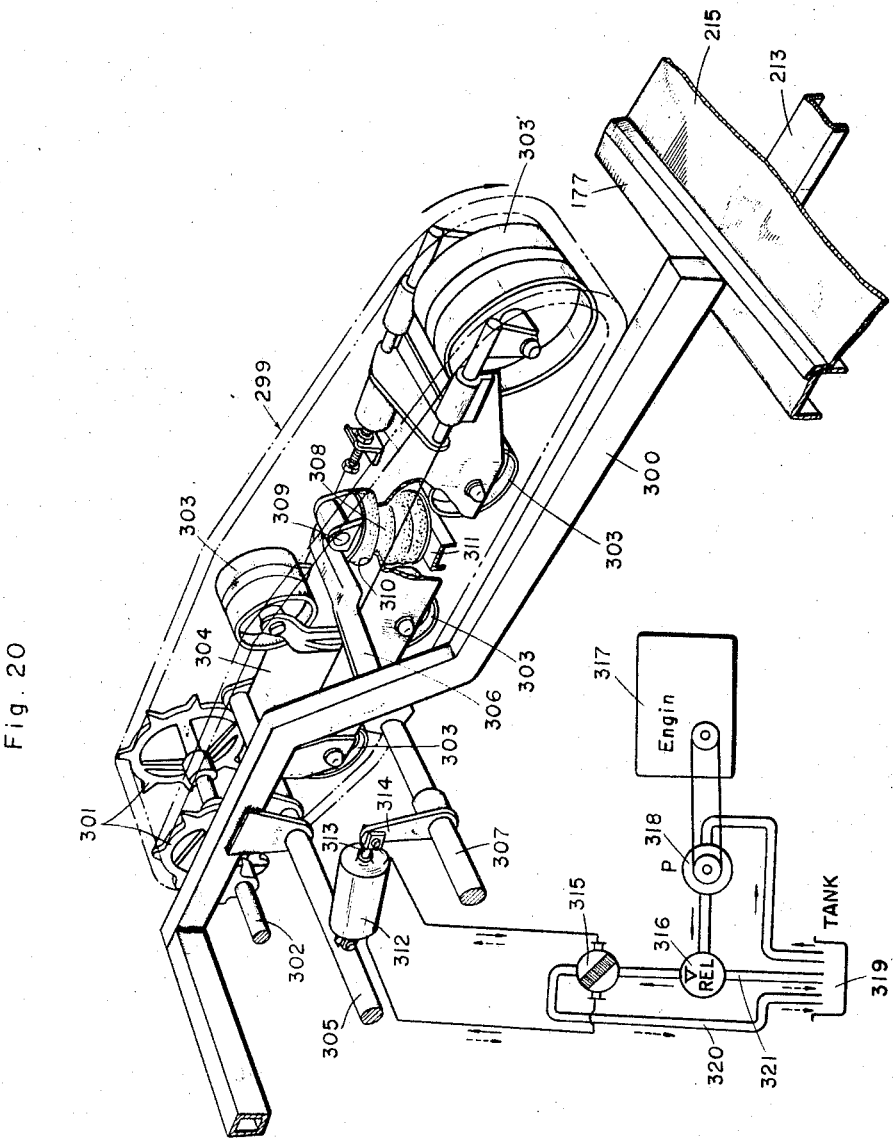
FIGURE 20 is a front perspective elevation showing the structure of one of the crawler type track assembly and oil lines of hydraulic system of this invention and the motive power system of said unit.
Figure 21:
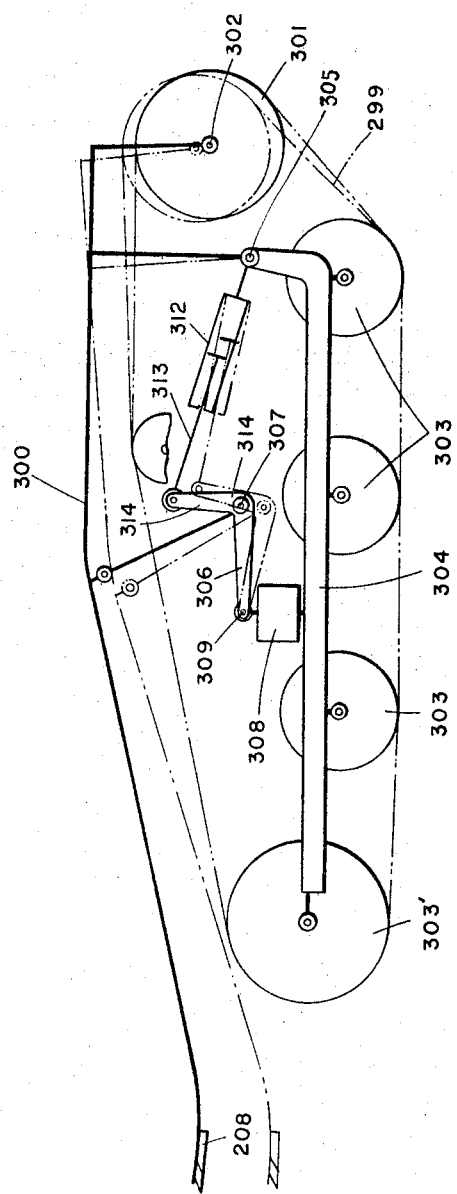
FIGURE 21 is a partially removed schematic side elevation showing said crawler type suspension unit of this invention.

Referring now to FIGURES 20 and 21, a main frame 300 constituting a chassis for mounting the grain separating assembly housing 102 is secured at the front end to the transverse beam 177 and journals a shaft 302 which drives a sprocket 301. Parallel with and forwardly of said shaft 302 there is pivotally mounted on said base frame 300 a rod 305 having its terminal end connected to the rear section of a track frame 304 which carries track rollers 303. The rod 305 is operatively interconnected with a pressure cylinder 312. Parallel to and forwardly of the rod 305 another rod 307 is journalled on the frame 300 and joined with an arm 306 pivotally connected to a buffer 308 by means of a buffer pin 309. The rod 307 is connected to an oil pressure cylinder 312 by piston rod 313 and lever 314. The buffer 308 is loosely fitted in an aperture 310 provided in the upper plate of the track frame 304 and is supported on a transverse beam 311 secured to said track frame 304. The hydraulic pressure cylinder 312, on the other hand, is operatively associated with the hydraulic pump 318 through a rotary valve 315 and a relief valve 316. The pump 318 is driven by the engine 317 and draws fluid from a tank 319 with fluid return lines 320 and 321 being provided from the rotary valve 315 and from the relief valve 316. The track roller 303' in particular is constantly acted upon by means of a spring mechanism (not shown) to hold in a tensioned state the crawler of the entire running gear unit. The engine 317 is mounted on a platform 322 provided on the running gear unit as shown in FIGURE 2.

POWER TRANSMISSION SYSTEM

Figure 22:
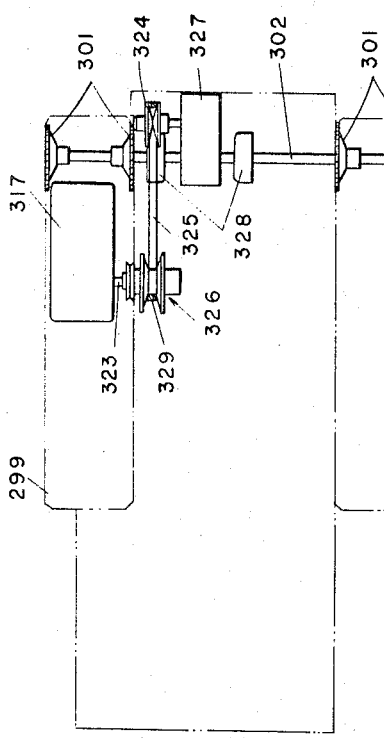
FIGURE 22 is a schematic plan view showing a driving system for a running unit of this invention.

The power transmission system employed in this invention is schematically shown in FIGURES 22 and 23. The driving shaft 323 of the engine 317 is operatively associated with the crawler unit driving axle 302 by a stepless speed changer assembly 326 comprising of two variable diameter V-belt pulleys 324 and V-belt 325 and transmission 327. There is contained in said transmission 327 steering clutches (not shown) for selectively imparting motive power to either of the two crawler type units 299. Brakes 328 are provided on each side of the transmission which can be operated either simultaneously or separately.

Referring to FIGURE 23, the engine shaft 323 is operatively associated by belt 329 with the grain separating drum driving shaft 106 which in turn is operatively associated by belt 330 with the grain threshing drum driving shaft 105, and on the other hand, the screw conveyor driving shaft 121, beater driving shaft 110, and grain sieve driving shaft 147 via belt 331. Said screw conveyor driving shaft 121 in turn is operatively associated with the blower driving shaft 128 via belt 332.

The above described power transmission system is disposed on the side of grain separating assembly housing 102 on the engine mounting floor frame. On the other side of the housing, the grain sieve driving shaft 147 is operatively connected by belt 333 with the grain stalk transfer assembly driving shaft 237 and via belt 334 with the driving shaft 335 of the blower 123 and the screw conveyor driving shaft 122. The grain stalk transfer assembly driving shaft 237, on the other hand, is operatively associated with the pick-up assembly driving shaft 272 and the reciprocating cutter assembly driving shaft 338 via belts 336 and 337 and idle pulley 339 is engaged with the belt 337. As shown in FIGURE 8, the vertical shaft 339 for actuating cutter unit 208 is provided on the terminal end with an eccentric pin 342 which is operatively engaged with a slot 341 which in turn is integrally associated with the movable cutter bar 340. A shield plate 343 protects the cutter unit actuating assembly (338, 342, 340), and is secured to the side casing.

The harvester combine of this invention is further provided, as shown in FIGURES 1, 2 and 3a, with a driver's platform 347 consisting of driver's seat 344, control box 345 and protector 346 mounted on the housing 102 in front of the grain tank 101. A transparent shield 348 (FIG. 2) covers a window provided in the upper shield plate of the grain tank 101, whereby the operator is able to have a clear view of the inside condition of the grain tank 101 even during operation.

FUNCTION OF THE MACHINE

Power delivered from engine 317 drives not only the running gear assembly to move the machine but also all the movable components of the grain separating and harvesting parts of the machine.

As shown in FIGURE 10, the driving shaft 237 of the grain stalk transfer assembly drives the endless flat belt 230 of the stalk head conveyor unit 211, the endless chain 228 of the intermediate conveyor unit 210, and another endless chain 220 of the lower conveyor unit 209, all in the same direction simultaneously, together with the endless belt 238 of the stalk head feeding unit 212 (FIGS. 9, 11, 15); and, as shown in FIGURE 16, the driving shaft 237 rotates via driving shaft 272 operatively associated therewith all the endless chains 257, the rotating drum packers 279 from drum packer driving shaft 276 (FIG. 11) together with plate packers 285 via flexible shafts 284 (FIG. 11).

As shown in FIGURES 15, 18 and 19, each of the operated endless chains 257 causes the active cam face 258a of each of the grain stalk pick-up members 258 to come into contact with the cam plate 265 one after another to laterally extend said pick-up members 258 through the longitudinal slots 267 provided between the lid 253 and the side plates 266 of each of the casings 252. Each of the grain stalk pick-up members 258 travels upwards one after another along said longitudinal slots 267 until each of said pick-up members 258 in operating position departs from the terminal end of the cam plate 265 and comes into contact with the deflectors 270 and is folded into the casing 252. Each of the folded pick-up members 258 then turns to the downward direction one after another around the upper sprocket wheel 261 and travels along the rear side of the chain receiver plate 262 until said member in idle position turns round the lower sprocket wheel 260 and comes into contact with the lower end of the cam plate 265 to travel upwards extended laterally through the slots 267. In this case, the direction of rotation of the endless chains 257 is counterclockwise as viewed in FIG. 9. But it is possible to employ clockwise rotation and laterally project the grain stalk-pick-up members 258 by arranging the cam plate 265 along the lower portion of chain travel.

Figure 25:
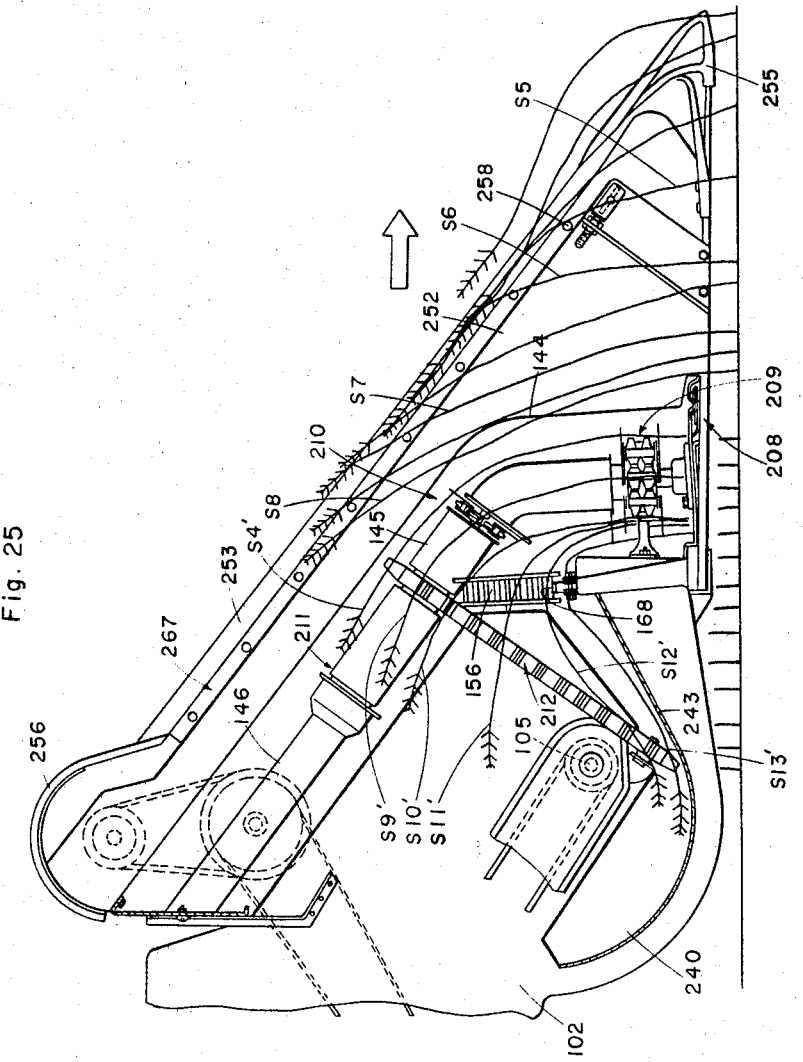

With the forward travel of the machine, the dividers 255 and the casings 252 push aside the standing grain stalks to divide them into suitable bulks or rows, of which the straight stalks are readily brought into contact with the cutter unit 208 from the action of the plate packers 285. In the case of grain stalks SI which are bending and tilting in the same direction of the machine travel, as schematically illustrated in FIGURE 24, any of the operated pick-up members 258 pass under the stalks as they are laterally extended by the action of the cam mechanism 258a and 265. The stalks SI thus raised are gradually brought by the action of the laterally extended pick-up members 258 on ascending travel along the slots 267, to a vertical position S, then to a rearward tilted and bent position $S_2$, to a further rearwardly bent position $S_3$, where the pick-up members start departing from the cam mechanism as the stalks are cut by the cutter unit 208, and finally to the position $S_4$ where the cut stalks are curved so as to be spaced at substantially the same predetermined distance from the conveyor assembly 209, 210 and 211, all in conjunction with forward travel of the machine. In the case of grains stalks $S_5$ (FIG. 25) bending and tilting rearwardly relative to the machine, the pick-up operation is carried out substantially in the identical manner as described above. As shown in FIGURE 25, any of the pick-up members 258 pass under the stalks to uplift the bent stalks $S_5$, and the stalks are gradually brought to positions $S_6$ and $S_7$ and to the position $S_8$ where the pick-up members release the cut stalks and feed them to the conveyor assemblies 209, 210 and 211, all in accordance with the forward travel of the machine.

Thus, the most desirable working effects of the grain stalk pick-up mechanism of this invention are obtained as a function of the speed of travel of the machine and of the pick-up members.

The grain stalk pick-up mechanism of this invention has marked advantages over the conventional reel type pick-up. The mechanical impulse or shocks applied to the grain stalks are reduced to a minimum extent. The posture of stalks which is generally quite irregular particularly in the cae of crops having heavy grain heads like rice plant, can be readily accommodated or adjusted to a uniform bearing suitable for cropping, so that the stalks can be cropped at a uniform stub height without any substantial head loss. Together with the divider acting on the butt end portion of the talks, the inclined casings 252 divide the upper portion of the stalks to part them into uniform suitable bulks, so that winding or entangling of the grain stalks is substantially eliminated. To reduce the head loss to a minimum extent, the machine is adapted to allow each of the grain stalk pick-up members in operating position to release the stalks before reaching the grain heads thereof.

The grain stalks are thus made ready for further treatments. The butt end portion passing through the bearing plate 287 and the guide plate 290 (FIG. 12), is brought to the cutter unit 208 to be cropped therewith. Since the plate packers 285 hold the lower portions of the stalks at a predetermined distance upwardly from the cutter unit 208, the stalks are cropped without any failure even if there is a little displacement between the overlapping cutter blades.

Further, the rotating plate packers 285 prevent the cropped stalks from falling off the deck plate 215.

As a result of the above-mentioned pick-up operation, the cropped stalks can then be intercepted by the conveyor unit almost simultaneouly. The head portion of the stalks is fed on to the stalk head conveyor unit 211 by the action of the drum packer 279 in association with the endless flat belt 230. The intermediate stem portion of the stalks is intercepted between the projections 229 of the intermediate conveyor unit 210. The butt end portion or lower portion of the stalks is intercepted between the projections 221 of the lower conveyor unit 209. And the cropped stalks are transferred laterally in a state where they are rearwardly inclined along the grain stalk transfer system. Together with the plate packers 285 and drum packers 279, the resilient plates 293 and 298 (FIG. 11) prevent the cropped stalks being transferred from falling off the system and facilitate the feeding of the cropped grain stalks to the respective conveyor units. Unlike the conventional single conveyor system, the plurality of conveyors of the invention, constructed and arranged in accordance with the shape of the respective portions of the stalks, transfer the cropped stalks in an orderly manner without any substantial loss of grains or entangling. The construction material is also relatively reduced.

When the grain stalks which are being transferred reach the righthand terminal end of the transfer system, the butt end portions turn to the rearside reverse passage around the terminal sprocket 219 in conjunction with the action of the guide plates 293 and resilient plate 294 (FIG. 14). Simultaneously, the intermediate stem portion of the stalks is released from the projections 229 of the intermediate conveyor unit 210 by the release plate 251 and interposed between the shield plate 295 and the endless belt conveyor 238 of the stalk head supply unit 212 (see $S_9$ to $S_{11}$, $S_{9'}$, to $S_{11'}$, FIGS. 24, 25). Consequently, the grain stalks turn to a lateral, lefthandwise in the instant embodiment, reverse direction by the action of the conveyor 209 while the stalkhead portion is bent downwardly at the intermediate stem portion of the stalks.

The intermediate stem portion of the stalks is gradually placed on the endless chain conveyor 168 (FIGS. 9 and 14) to be intercepted between said chain 168 and the downward part 160 (FIG. 6) of the endless chain 156 and is guided by the guide rail 172 and then between the lower part 159 of the feed chain 156 and the guide rail 157 for further lateral, lefthandwise, transfer (see $S_{12}$, $S_{12'}$, FIGS. 24, 25). In the meanwhile, the stalk head portion is gradually transferred into the aperture 240 (see $S_{13}$, $S_{13'}$, FIGS. 24, 25).

Thus, the above-mentioned feeding operation of the stalks into the stalk holding and transfer conveyor unit 158 is carried out smoothly and orderly by the action of the sprocket wheel 166 which is adapted to forcibly transfer the stalks from the endless chain 168 into the active space between the endless chain 156 and the guide rail 172 without causing any substantial accumulation of the stalks being transferred. Since the endless chain 156 also serves to engage the endless chain 168 with the sprocket wheel 166, the construction of the entire mechanism of this stalk holding and transfer system is quite simple.

In accordance with the transverse transfer of the grain stalks carried out by the action of the grain stalk holding transfer conveyor assembly 158, the head portion of the stalks are gradually brought into the active space between the grain threshing drum 103 (FIG. 3a) and the feed deck 111 in such a manner that the head portion of the stalks is placed on the feed deck 111 substantially parallel to the direction of the rotation of the teeth 107, as the stem portion of the stalks is being transferred transversely, lefthandwise in the instant embodiment, while the intermediate stem portion is firmly held in the transverse conveyor unit 158. Grains are thus threshed off the stalks by the rotating of the teeth 107. Baffle plates 112 act as means for imparting a wave-like movement to the head portion of the grain stalks being treated and transversely transferred, so that the stalk head portion is caused to come into more active and effective contact with the grain threshing teeth 107.

The relative length of the head portion of the stalks being treated has a bearing on the grain separating action. The grain stalks cropped and transferred in the initial state as they are standing on the field are usually of irregular length and the longer stalks tend to extend deep into the grain threshing passage so that the stalks are crushed into chips and the resultant trash material accumulates in the effective space of the grain threshing chamber to the detriment of the threshing operation, causing a power loss. In such a case, the support frame 167 (FIG. 6) may be raised along the slot 175 by means of the bolt and nut 176 to raise the effective contact point of the two endless chains 156 and 168 so as to allow the stalk holding transfer mechanism 158 to hold the stalks more shallow that is, toward the head portion thereof. Thus the grain threshing depth of the stalk head is mechanically modified to a desired extent. In this case, the butt end portion of the stalks are allowed to travel in the initial state along the surface of the deck plate 215, the lower portion of the stalks outside the grain stalk holding transfer mechanism 158 being more or less bent in accordance with the adjusted grain threshing depth. When the stalks being treated are unduly short, or when such stalks are presented in the crop being harvested, the aforesaid frame 167 is lowered along the slot 175 to adjust the height of the effective contact point of the two endless chains 156 and 168 so as to produce a desired grain threshing depth of the stalk head portion. Thus all the grain stalks, either too long or too short, can be effectively treated by merely adjusting the height of the effective contact point of the two endless chains 156 and 168.

The grains threshed from the stalks is sent rearwardly through grain sieve 114 (FIGS. 3a, 4) and fall into the screw conveyor trough 120 after being separated from foreign material by air currents generated by the blower 123, said foreign material being discharged out of the system by the suction blower 125. Tailings, trash materials and grain that cannot pass through the grain sieve 114 travel laterally in accordance with the transverse transfer of the stalks and are thrown up into the secondary grain separating chamber 150 by the action of the beater 109 to be further treated there with the grain separating teeth 108 of the grain separating drum 104. The grain thus separated is sent into the aforesaid trough 120 through grain sieve 115. The remaining material that cannot pass through the sieve 115 is sent to the grain sieve 129 via the discharge aperture 137. Said material is separated there into grains and trash by the action of the sieve 129 and of the air currents generated by the blowers 123 and 125. The separated grain travels into the grain trough 120 via straw rack 133 and apertures 135 constituting the sieve 129, and the remaining trash material is blown out of the machine via exhaust duct 127 by the action of the suction blower 125.

Since grain separating is carried out by firmly holding the stem portion of the stalks, trash material generated is negligible in quantity as compared with the conventional combine, and is easily discharged out of the system, yielding the grains completely separated from trash material.

The grains thus separated and accumulated in the trough 120 are caused to travel upwards through the elevator 151 by the action of the screw conveyor 118 and gradually fall into the grain tank 101. Those grains still clustering around a stem or stems, or on a non-removed stem, which are usually intermingled in the separated grains and blown upwards by the action of the air currents, fall upon the rearside-wall plate 116 before reaching the suction pipe 126 and are sent into the guide trough 119. The grains thus accumulated are then transferred via grain lifter 149 into the secondary grain separating chamber 150 by the action of the screw conveyor 117 for further treatment there, and then are sent into the grain tank 101 like the other grains after being duly separated from trash material.

The employment of two blowers 123 and 125 causes the ascending drafts or air currents to be relatively stronger in force at the peripheral portion of the sieve 129, so that the separating efficiency of the effective area of the sieve is satisfactorily improved due to moderate air currents applied to said area. At the same time, those drafts or air currents blowing upwards in the proximity of the upper rim of the sieve 129 are in the form of a turbulent flow due to the sucking action of the nearby suction blower, whereby the sieve is protected from the usual deterioration in separating efficiency in said area.

The threshed straws or stalks are gradually released from the holding mechanism 158 and continuously discharged through aperture 206 (FIG. 7) operatively associated with the grain shield 205 into the auxiliary grain separating assembly, integrally connected to the outer lefthand side of the housing 102. The lower portion of the straw is released from the projections 221 of the lower transverse conveyor unit 109 by means of the release plate 250 (FIG. 8); the intermediate portion is mechanically dragged into the effective space between the endless belt 180 and the guide frame 201 in cooperation with the projections 178 integrally provided on said belt 180; and the head portion now removed of the grains is drawn into the effective space between the endless belt 181 and the guide frame 202 in cooperation with the projections 179 integrally provided on said belt 181.

There may however be a few grains sticking or clinging to the straws being discharged. As shown in FIGURE 3a, the primary grain threshing drum 103 rotates at a relatively high speed, so that some of the grains separated from the stalks rotate with the drum 103 and finally cling to the stalks or straws being transferred to be discharged there from the housing 102. To meet such a situation, the endless belt 181 is so adapted as to rotate at a speed faster than that of the other belt 180 which in turn is so adapted as to move faster than the feed chain 156, by use of large diameter pulley 184, so that the straws intercepted between the belts 181 and 180 and each corresponding guide rails 202 and 201 are differentially spaced out one after another, allowing the grains sticking therein to fall upon the inwardly tilted grain recovering plate 204 and to return into the housing 102 via aperture 206 and ultimately into the grain tank 101. Those grains still clinging to the straws irrespective of the intercepting action of the endless belts 180 and 181 operating in association with the corresponding guide frames 201 and 202 are separated from the straws by shock applied thereto by the packer 182 which is rotating at a speed still faster than that of the belt 181. In this manner, all grains clinging or sticking to the straws are separated or removed from the straws and collected without any substantial loss.

In the course of the threshing operation, the stalks or straws are transferred in a state substantially parallel to the direction of the machine on forward travel, so that the straws discharged out of the machine would be thrown upon the field in a parallel, overlapping condition, to the detriment of subsequent collecting and drying operation. To avoid such a disadvantage, the endless belt 181 is so adapted as to rotate faster than the belt 180 as stated before, so that the head portion of the straws is discharged out of the machine while the lower portion of the straws is still intercepted between the discharge units 180 and 201.

As a result of this different discharging action, the straws are scattered upon the field uniformly and transversely to the machine, this state being quite advantageous for subsequent drying and collecting operations. To further secure this result, there is provided a butt end checker 180' in such a manner as to retard the lower portion of any straws leaving the discharge units 180 and 201 unduly faster than the intermediate portion of the straws. Cropping of grain stalks, separating of grains, and straw discharging operations of this invention are thus carried out in a continuous manner while the machine advances.

The harvester combine of this invention is constructed in quite a compact and convenient form as compared with the conventional machines. In a soft and muddy field the machine is apt to sink in the ground. Such a situation is partially avoided by adjusting the vertical position of the grainhead position control mechanism 167, as mentioned above. More satisfactory results are obtained by controlling the height of the main body of the machine. In this invention, this operation is carried out by operating the rotary valve 315 (FIG. 20) acting on the arm 306 by the hydraulic system 312, 313, 314, 307, 316, 318 and 319. The resultant downward turn of the arm 306 ultimately raises the body of the machine together with the base frame 300 in cooperation with buffer pin 309, buffer 308, and transverse rod 305, as shown by solid lines in FIGURE 21, and the cutting height is thereby increased to a desired extent. To reduce the cutting height, on the other hand, the rotary valve 315 is so operated as to turn the arm 306 upwards relative to the frame 300, whereby the body of the machine is lowered to a desired extent. Thus the modification of the cutting height is carried out by controlling the height of the main body of the machine relative to the running gear assembly, whereby the power transmission system can be simplified.

The sprocket 301 that drives the road wheel is journaled on the base frame 300, the engine 317 is also mounted on said frame 300 and the power transmission system is simplified to the maximum extent. To eliminate the undue tension ultimately applied to the crawlers of the running gear unit as a result of modification necessarily applied to the machine, i.e. the vertical adjustment of said base frame 300 to meet the standing conditions of the plants or to modify the cutting height, there is provided a spring mechanism (not shown) which is so adapted as to shift back and forth the position of the track roller 303' in accordance with the tension applied to the crawlers. Buffer 308 is provided for protection of the body of the machine and the operator from the mechanical shocks caused by the running gear assembly.

The contents of the grain tank 101 is discharged by operating the shutter 153. For satisfactory effects, the body of the machine is substantially tilted rearwardly by controlling the rotary valve 315 as is the case for adjusting the cutting height, allowing no grain to remain undischarged in the tank. No other discharge device is necessarily applied even when the capacity of the grain tank is substantially increased by making the floor flat.

Figure 26:
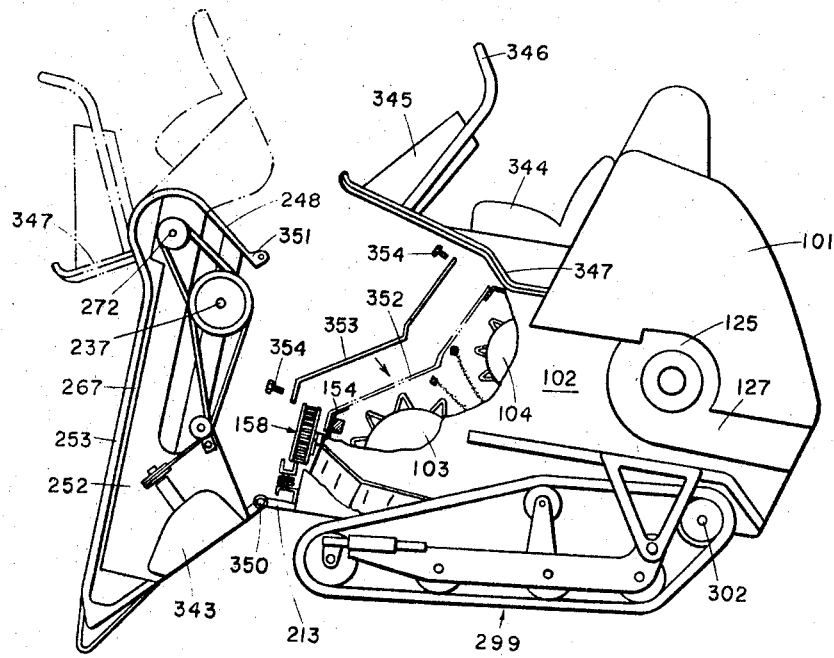
FIGURE 26 is a side elevation of another mode of embodiment of this invention.

In FIGURE 26 is illustrated another machine embodying the principles of this invention. The frontal portion of the frame 213 is so adapted as to swing on the transverse beam 350 acting as a hinge or joint, and an eye plate 351 integral with the bracket 248 is employed as a means for releasably connecting the bracket 248 with the grain separating assembly housing 102. An opening 352 is provided in the frontwall plate 154 of the grain separating assembly housing 102 and is so adapted as to allow viewing of the interior portion of the housing 102. A lid 353 is applied to the opening 352 by means of bolts 354. As shown in FIGURE 26, the frontal portion of the frames 213 is swung downwards around the transverse beam 350 and the lid 353 is removed for inspecting the working conditions of the drums 103 and 104 and other parts inside the grain separating assembly housing 102. Repairing and overhauling of said parts inside the housing 102 can also be performed quite easily.

Alternately, the front portion of the above-mentioned frames 213 may be removably mounted.

Figure 27:
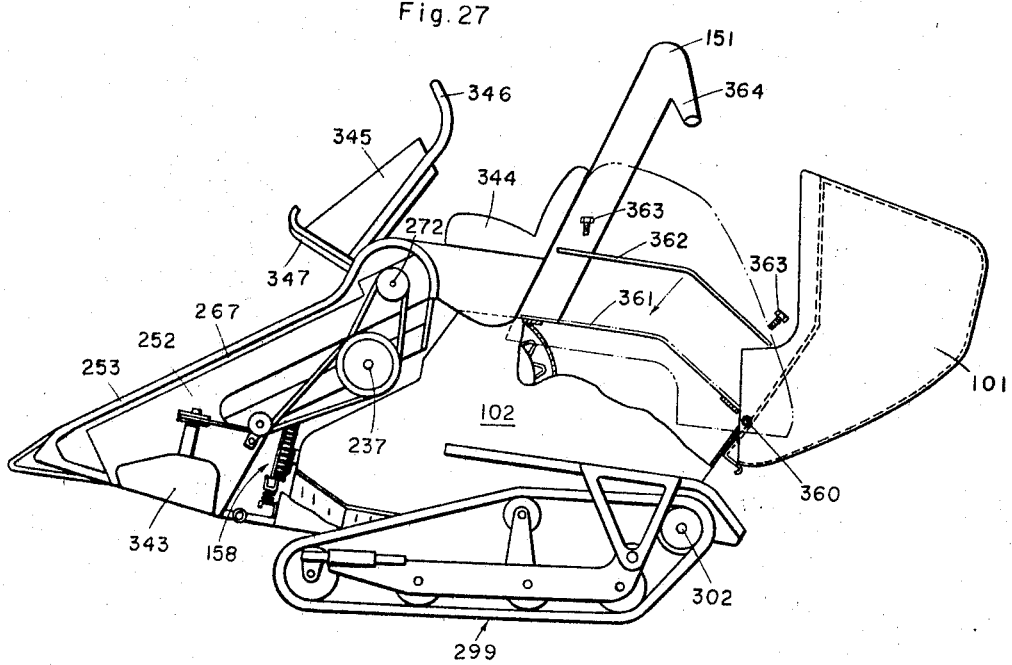
FIGURE 27 is a side elevation of still another mode of embodiment of this invention.

In FIGURE 27 is shown another embodiment of this invention, wherein the grain tank 101 is pivotally attached to the grain separating assembly housing 102 by means of a transverse rod 360 associating the rear bottom corner of the grain tank 101 with the upper rear corner of the grain separating assembly housing 102. An opening 361 is provided in the upper-wall plate of the grain separating assembly housing 102 and which is normally closed by the overhanging bottom-wall plate of the grain tank 101. In the instant embodiment as shown in FIGURE 27, the grain tank 101 is swung down and rearwards around the transverse rod 360 to facilitate the inspection of the working conditions of the rear interior section of the grain separating assembly housing 102. Repairing and overhauling of said section can also be carried out quite conveniently. A lid 362 is adapted to protect, where desirable, the opening 361 and is releaseably attached to the upper-wall plate of the grain separating assembly housing 102 by means of bolts 363. As shown in FIGURE 27, the grain elevator 151 is desirably provided at the terminal outlet portion with a chute 364 downwardly opening into the grain tank 101. The operator's platform 347 indicated by broken lines in FIGURE 26, is disposed on the grain stalk pick-up assembly casings 252 so as to provide a means for creating an opening in the upper-wall plate of the grain separating assembly housing 102 for inspection and access to the grain separating drum 104 and other elements thereabout.

As disclosed before, the grain threshing mechanism of this invention is confined to the head portion of the stalks. There is no device employed for sorting out treated stalks or stems. In consequence, the entire construction is markedly minimized into a compact type and the working effects are improved to the maximum extent with the minimized economic motive power. Discharge of treated stalks or stems in order is particularly effective for collecting and other subsequent treatments thereof. By sufficiently decreasing cutting height, the subsequent treatments of the filed, such as ploughing or fertilizing, can be carried out easier than ever. It is to be noted that such a decrease in the cutting height does not affect the threshing and separation of grains.

In this invention, the grain threshing drum being disposed transversely and rearwardly to the transverse grain stalk transfer assembly, the length and height of the entire construction are particularly minimized, producing a desirable stability. Transferring grain stalks along the rearwardly inclined transfer system contributes to minimizing the entire construction.

The harvester combine of this invention is particularly devised as to meet the requirements of rice plant harvesting. The harvester combine, however, may be applied to the treatment of any other grain stalks such as wheat and barley without any structural modifications, producing the desired effects substantially identical with those on rice plants.

In view of the foregoing, it may become apparent that various changes and modifications may be made to the embodiment of this invention without departing from the principles of the same. Accordingly, the invention is to be interpreted within the scope and spirit of the appended claims.

What we claim is:

1. In a harvester having a running gear, a main frame, grain threshing means, and cutting means facing in the direction of forward movement of the machine, the improvement comprising means for feeding grain stalks from said cutting means to said threshing means including
    guide surface means positioned rearwardly of said cutting means and facing in the direction of forward movement of the machine along which guide surface means stalks are transversely transferred while leaning thereagainst;
    said guide surface means including an upstanding lower portion, an upper portion inclined rearwardly relative to said lower portion, and a stalk lower end transfer guide surface extending along the lower edge of said lower portion of the guide surface and positioned between said lower edge and said cutting means, said stalk lower end transfer guide surface being substantially perpendicular to the surface of said lower portion; and
    means for transversely transferring stalks associated respectively with said upper and lower portions.

2. A harvester as set forth in claim 1 including means for engaging and rearwardly transferring grain stalks, said means being disposed above said cutting means and in front of the lower portion of said guide surface means.

3. A harvester as set forth in claim 1 wherein,
    said grain threshing means include a drum for combing grains off stalk heads,
    a drum chamber housing said drum therein,
    an inlet opening in said chamber for grain stalk heads disposed near one end of said drum,
    a discharge opening in said chamber disposed near the other end of said drum for discharging the combed grain stalks,
    a passage extending along said chamber for establishing communication between said inlet and discharge openings, and
    grain stalk holding and transfer means extending along said passage for conveying grain stalks along said passage with the grain heads thereof extending into said chamber for threshing action by the drum.

4. A harvester as set forth in claim 3 wherein said drum chamber is disposed below the upper portion of said guide surface means.

5. A harvester as set forth in claim 4 wherein said grain stalk holding and transfer means is disposed between the drum chamber and the transverse transferring means and is adapted to move grain stalks in a direction opposite to the direction of transfer of grain stalks by said transverse transfer means, and the drum has a rotary axis disposed transversely to the direction of travel of the machine.

6. A harvester as set forth in claim 5 wherein said transverse transfer means includes an endless belt provided with projections adapted to extend into a stalk guide path defined between said stalk-holding-and-transfer-means and at least a part of the return path portion of said endless belt, and said endless belt serving to transfer at least a part of the grain stalks being transferred by said stalk holding and transfer means while such projections extend into said stalk guide path.

7. A harvester as set forth in claim 3 wherein on the outer side of the discharge opening there is provided a deflecting and discharging device whereby stalks which are being discharged with their axes being substantially horizontal and substantially parallel to the direction of travel of the machine are deflected in such a manner that their axes are substantially perpendicular to said direction, and then the thus deflected stalks are discharged.

8. A harvester as set forth in claim 7 wherein said deflecting and discharging device includes means for transferring discharged stalks in such a manner as to move the head portions faster than the lower end portions thereof, and abutment means for acting on the lower end portions of stalks immediately before the stalks leave the first-mentioned means thereby deflecting these stalks.

9. A harvester as set forth in claim 3 wherein said grain stalk holding and transfer means comprises,
an endless feed chain having a portion moving along said passage,
a guide rail disposed adjacent to said chain portion, said fed chain further including a downwardly moving portion adjacent said inlet opening,
a frame adapted to be raised and lowered along said downwardly moving chain portion,
a guide rail portion connected to said frame and extending along said downwardly moving chain portion, and
an auxiliary endless conveyor journalled in said frame for feeding the stalks thereon to a path between the downwardly moving chain portion and the guide rail portion.

10. A harvester as set forth in claim 3 wherein the grain threshing means further includes,
a second drum housed in a second chamber disposed rearwardly and upwardly relative to the first mentioned drum chamber, said second drum being substantially parallel to the first mentioned drum;
means for lifting grain from the first to the second chamber;
a blower disposed rearwardly of the first chamber and below the level of the second chamber;
an inclined separating chamber disposed between the first chamber, second chamber and blower and communicating with said blower, said separating chamber receiving air current from said blower to separate tailings from grains;
a movable grain sieve housed in said separating chamber;
suction means for discharging the tailings in the separating chamber;
a first grain-collecting screw conveyor disposed in the lower portion of said separating chamber;
a second grain-collecting screw conveyor disposed intermediate of said separating chamber;
a grain receptacle and first means for delivering grains from the outlet of the first screw conveyor thereto; and,
second means for feeding grains from the outlet of the second screw conveyor to said second chamber.

11. A harvester as set forth in claim 10 comprising a screening net defining a part of the rear wall of the first chamber for establishing communication between the interior of said first chamber and said separating chamber and for feeding grains from the first chamber to the separating chamber, and
means for feeding those grains from the first to the second chamber which have been separated in the first chamber but which have not passed through said screening net.

12. A harvester as set forth in claim 3 including auxiliary grain separating means comprising
a stalk discharging conveyor means disposed outside the discharge opening in the drum chamber whereby stalks being transversely discharged in substantially horizontal position from said discharge opening are received and delivered along a substantially horizontal surface extending axially of the drum;
means for driving said discharging conveyor means at a speed faster than that of the stalk holding and transfer means; and,
grain recovery means positioned below said stalk discharging conveyor means.

13. A harvester as set forth in claim 12 including a shock-imparting device for imparting shocks laterally to the stalks being discharged by said discharging conveyor means.

14. A harvester as set forth in claim 13 wherein the shock-imparting device is located in the feed path of said second conveyor.

15. A harvester as set forth in claim 12 wherein said discharging conveyor means comprises,
a first conveyor,
a second conveyor transferring the head portion of stalks, and
means for driving said second conveyor at a speed higher than said first conveyor.

16. A harvester as set forth in claim 3 wherein the drum chamber is so disposed that its bottom is substantially on a level with said cutting means.

17. A harvester as set forth in claim 16 wherein said grain stalk holding and transfer means is disposed between the drum chamber and the transverse transfer means and is adapted to move grain stalks in a direction opposite to the direction of transfer of grain stalks by said transverse transfer means.

18. A harvester as set forth in claim 1 wherein the main frame on which are installed the cutting means, grain stalk feeding means and grain threshing means is pivotally connected in the rear portion of the machine to a second frame on which is installed the running gear for pivotal movement between said frames relative to each other to cause relative vertical movement therebetween, and wherein there is provided means for adjustably causing such pivotal movement.

19. A harvester combine comprising a cutting assembly; a grain threshing assembly including a housing and a drum therein for combing grains off stalks, an inlet opening in said housing disposed near one end of said drum for grain stalk heads, a discharge opening in said housing disposed near the other end of said drum for discharging the combed grain stalks, a passage extending along said housing and effecting communication between said feed and discharge openings, a grain stalk holding and transfer means extending along said passage for conveying stalks along said passage with the grain heads thereof extending into the housing for threshing action by the drum, means for feeding grain stalks from said cutting assembly to said grain stalk holding and transfer means and maintaining the head and stem ends of the grain stalks in the same orientation, a straw discharge opening, an auxiliary grain separating assembly associated therewith, said auxiliary grain separating assembly including straw discharging conveyor means, means for imparting shocks to the straws being discharged, and means for driving said straw discharging conveyor means at a rate faster than that of said grain stalk holding and transfer means, said straw discharging conveyor means including a first conveyor and a second conveyor, said second conveyor transferring the head portion of stalks, and means for driving said second conveyor at a speed higher than said first conveyor; and a running gear assembly.

20. A harvester combine as set forth in claim 19 wherein said means for imparting shocks to the straws being discharged is located in the feed path of said second conveyor, and a grain recovery plate is located under the auxiliary grain separating assembly.

21. A harvester combine comprising a cutting assembly; a grain threshing assembly including a housing and a drum therein for combing grains off stalks, an inlet opening in said housing disposed near one end of said drum for grain stalk heads, a discharge opening in said housing disposed near the other end of said drum for discharging the combed grain talks, a passage extending along said housing and effecting communication between said feed and discharge openings, a grain stalk holding and transfer means extending along said passage for conveying stalks along said passage with the grain heads thereof extending into the housing for threshing action by the drum, means for feeding grain stalks from said cutting assembly to said grain stalk holding and transfer means and maintaining the head and stem ends of the grain stalks in the same orientation, a straw discharge opening, an auxiliary grain separating assembly associated therewith and including straw discharging conveyor means and means for imparting shocks to the straws being discharged, a deflecting device provided on the outer side of the straw discharge opening to change the direction of the discharge straw transversely to the direction of travel of the machine; and a running gear assembly.

22. A harvester combine comprising a cutting assembly; a grain threshing assembly including a housing and a drum therein for combing grains off stalks, an inlet opening in said housing disposed near one end of said drum for grain stalk heads, a discharge opening in said housing disposed near the other end of said drum for discharging the combed grain stalks, a passage extending along said housing and effecting communication between said feed and discharge openings, a grain stalk holding and transfer means extending along said passage for conveying stalks along said passage with the grain heads thereof extending into the housing for threshing action by the drum, means for feeding grain stalks from said cutting assembly to said grain stalk holding and transfer means and maintaining the head and stem ends of the grain stalks in the same orientation, a grain stalk pickup assembly including a plurality of forwardly and downwardly inclined casings mounted on the front end of the combine with the forward ends of said casings projecting in advance of said cutting assembly, adjacent pairs of said casings defining grain stalk pickup paths, at least one endless conveyor mounted in each casing and extending from a location in advance of said cutting assembly to a location above said grain stalk feeding means, a plurality of pickup members movably mounted on each conveyor, means for moving said pickup members from a retracted position in said casing during forward and downward travel to a position extending from said casing during upward and rearward travel towards said feeding means; and a running gear assembly.

23. A harvester combine as set forth in claim 22, wherein said means for moving the pickup members between retracted and extended positions comprises a cam plate mounted adjacent the path of travel of said endless conveyor.

24. A harvester combine as set forth in claim 22, wherein said pickup assembly further includes at least one packer wheel mounted in each pickup path for rotation above and adjacent said cutting assembly on a vertical axis, said packer wheel being provided with means for engaging and rearwardly transferring grain stalks severed by said cutting assembly.

25. In a harvesting machine having cutting means facing in the direction of forward movement of the machine, the improvement comprising means for feeding grain stalks from said cutting means including
guide surface means positioned rearwardly of said cutting means and facing in the direction of forward movement of the machine along which guide surface means stalks are transversely transfer.ed while leaning thereagainst;
said guide surface means including an upstanding lower portion, an upper portion inclined rearwardly relative to said lower portion, and a stalk lower end transfer guide surface extending along the lower edge of said lower portion of the guide surface and positioned between said lower edge and said cutting means, said stalk lower end transfer guide surface being substantially perpendicular to the surface of said lower portion; and
means for transversely transferring stalks associated respectively with said upper and lower portions.

26. A harvesting machine as set forth in claim 25 including means for engaging and rearwardly transferring grain stalks, said means being disposed above said cutting means and in front of the lower portion of said guide surface means.

27. In a harvesting machine having cutting means facing in the direction of forward movement of the machine, the improvement comprising a grain stalk pickup assembly including a plurality of casings mounted on the front end of the machine with the forward ends of said casings projecting in advance of said cutting means, adjacent pairs of said casings defining grain stalk pickup paths, at least one endless conveyor mounted in each casing and extending from a location in advance of said cutting means to a second location rearwardly thereof, a plurality of pickup members movably mounted on each conveyor, and means for moving said pickup members from a retracted position in said casing during forward travel to a position extending from said casing during rearward travel toward said second location.

28. A harvesting machine as set forth in claim 27, wherein said means for moving the pickup members between retracted and extended positions comprises a cam plate mounted adjacent the path of travel of said endless conveyor.

29. A harvesting machine as set forth in claim 27, wherein said pickup assembly further includes at least one packer wheel mounted in each pickup path for rotation above and adjacent said cutting means on a vertical axis, said packer wheel being provided with means for engaging and rearwardly transferring grain stalks severed by said cutting means.

30. A harvesting machine as set forth in claim 27 further comprising means mounted adjacent said second location for feeding grain stalks received from said pickup assembly.

31. A harvesting machine as set forth in claim 27, wherein said casings are forwardly and downwardly inclined, and each of said endless conveyors extends upwardly and rearwardly from said first to said second location.

References Cited
UNITED STATES PATENTS

| 636,085 | 10/1899 | Temple | 56—130 |
| 754,394 | 4/1904 | Silvis | 56—130 X |
| 1,565,078 | 12/1925 | Fitzgerald | 130—27.6 |
| 1,969,639 | 8/1934 | Claas et al. | 56—123 |
| 2,265,380 | 12/1941 | Maginn | 130—27.8 |
| 2,940,528 | 6/1960 | Magnuson. | |

ABRAHAM G. STONE, *Primary Examiner.*

PASQUALE A. RAZZANO, *Assistant Examiner.*

U.S. Cl. X.R.

56—19, 119; 130—27